United States Patent
Yoon et al.

(10) Patent No.: US 10,021,232 B2
(45) Date of Patent: Jul. 10, 2018

(54) MOBILE TERMINAL AND METHOD FOR CONTROLLING THE SAME

(71) Applicant: LG ELECTRONICS INC., Seoul (KR)

(72) Inventors: Sunghye Yoon, Seoul (KR); Jaeho Choi, Seoul (KR); Sujin Kim, Seoul (KR); Jiyoung Park, Seoul (KR); Jumin Chi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 14/523,448

(22) Filed: Oct. 24, 2014

(65) Prior Publication Data

US 2015/0128251 A1    May 7, 2015

(30) Foreign Application Priority Data

Nov. 5, 2013    (KR) .......................... 10-2013-0133748

(51) Int. Cl.

| | |
|---|---|
| *G06F 3/0482* | (2013.01) |
| *G06F 3/0484* | (2013.01) |
| *G06F 21/31* | (2013.01) |
| *G02B 27/01* | (2006.01) |
| *H04M 1/67* | (2006.01) |
| *G06F 3/01* | (2006.01) |
| *H04M 1/725* | (2006.01) |

(52) U.S. Cl.
CPC ............... *H04M 1/67* (2013.01); *G06F 3/011* (2013.01); *G06F 3/0482* (2013.01); *G06F 3/04842* (2013.01); *H04M 1/7253* (2013.01); *H04M 1/72583* (2013.01); *G02B 2027/0178* (2013.01); *G06F 21/31* (2013.01)

(58) Field of Classification Search
CPC ...... G06F 3/013; G06F 3/011; G06F 3/04842; G06F 1/1626; G06F 1/163; G06F 1/1639; H04N 2013/0463; H04N 2013/0461; H04N 2013/0465; G02B 27/01; G02B 2027/0178; G02B 2027/014; H04L 63/0428; H04W 4/008
See application file for complete search history.

(56) References Cited

U.S. PATENT DOCUMENTS

| | | | | |
|---|---|---|---|---|
| 6,529,209 | B1 * | 3/2003 | Dunn ..................... | G06F 21/84 345/629 |
| 6,597,328 | B1 * | 7/2003 | Stern ....................... | G09G 5/00 345/9 |
| 7,644,369 | B2 * | 1/2010 | Hoe-Richardson ..... | G06F 21/84 715/768 |
| 8,223,162 | B2 * | 7/2012 | Miyasaka ............ | H04N 1/4446 345/204 |

(Continued)

*Primary Examiner* — Tae K Kim

(74) *Attorney, Agent, or Firm* — Ked & Associates, LLP

(57) ABSTRACT

The disclosure relates to a mobile terminal communicable with a glass-type terminal and a method for controlling the same. The mobile terminal comprises a wireless communication unit configured to communicate with a glass-type terminal, a display unit configured to display visual information, and a controller configured to transmit output-limited information having a limitation in output on the display unit to the glass-type terminal so that the output-limited information may be output on the glass-type terminal when the mobile terminal is in communication with the glass-type terminal.

10 Claims, 17 Drawing Sheets

(56) References Cited

U.S. PATENT DOCUMENTS

| | | | | |
|---|---|---|---|---|
| 8,305,488 B2* | 11/2012 | Trowbridge | H04N 13/0048 | 348/387.1 |
| 8,421,812 B2* | 4/2013 | Miyasaka | G06F 21/84 | 345/204 |
| 8,446,462 B2* | 5/2013 | Shahraray | G02B 27/2264 | 348/56 |
| 8,458,619 B2* | 6/2013 | Hamzy | G06F 9/4443 | 715/710 |
| 8,750,558 B2* | 6/2014 | Lee | G09G 3/003 | 380/205 |
| 8,867,780 B2* | 10/2014 | Hodge | G06F 21/84 | 382/100 |
| 8,955,147 B2* | 2/2015 | Lee | G06F 21/74 | 726/27 |
| 8,966,656 B2* | 2/2015 | Hirsch | G09C 5/00 | 380/261 |
| 9,275,213 B2* | 3/2016 | Kundu | G06F 21/35 | |
| 9,418,215 B2* | 8/2016 | Kotla | G06F 21/36 | |
| 9,749,137 B2* | 8/2017 | Kundu | H04L 9/3231 | |
| 2003/0133569 A1* | 7/2003 | Stern | G06F 21/84 | 380/206 |
| 2004/0104864 A1* | 6/2004 | Nakada | G02B 27/017 | 345/8 |
| 2009/0051649 A1* | 2/2009 | Rondel | G06F 1/163 | 345/156 |
| 2009/0055654 A1* | 2/2009 | Dunn | H04M 3/382 | 713/182 |
| 2011/0206285 A1* | 8/2011 | Hodge | G06F 21/84 | 382/224 |
| 2012/0040623 A1* | 2/2012 | Liu | G06F 1/3203 | 455/67.13 |
| 2012/0075168 A1* | 3/2012 | Osterhout | G02B 27/017 | 345/8 |
| 2012/0194419 A1* | 8/2012 | Osterhout | G02B 27/0093 | 345/156 |
| 2012/0194420 A1* | 8/2012 | Osterhout | G02B 27/0093 | 345/156 |
| 2012/0194549 A1* | 8/2012 | Osterhout | G02B 27/0093 | 345/633 |
| 2012/0194550 A1* | 8/2012 | Osterhout | G02B 27/0093 | 345/633 |
| 2012/0194551 A1* | 8/2012 | Osterhout | G02B 27/0093 | 345/633 |
| 2012/0194552 A1* | 8/2012 | Osterhout | G02B 27/0093 | 345/633 |
| 2012/0194553 A1* | 8/2012 | Osterhout | G02B 27/0093 | 345/633 |
| 2012/0218188 A1* | 8/2012 | Kashitani | G06F 3/023 | 345/168 |
| 2012/0309388 A1* | 12/2012 | Moosavi | H04W 52/0254 | 455/426.1 |
| 2013/0050189 A1* | 2/2013 | Tseng | G02B 27/2264 | 345/419 |
| 2013/0057526 A1* | 3/2013 | Ikeda | G09G 3/003 | 345/204 |
| 2013/0127725 A1* | 5/2013 | Sugimoto | G06F 3/02 | 345/168 |
| 2013/0147787 A1* | 6/2013 | Ignatchenko | G06T 11/60 | 345/419 |
| 2013/0169620 A1* | 7/2013 | Choi | G09G 5/12 | 345/214 |
| 2013/0169765 A1* | 7/2013 | Park | H04N 13/04 | 348/54 |
| 2013/0346168 A1* | 12/2013 | Zhou | G06F 1/163 | 705/14.4 |
| 2014/0067152 A1* | 3/2014 | Swanson | G07C 5/008 | 701/1 |
| 2014/0160002 A1* | 6/2014 | Dent | G06F 3/038 | 345/156 |
| 2014/0176417 A1* | 6/2014 | Young | G06F 1/163 | 345/156 |
| 2016/0147300 A1* | 5/2016 | Liao | H04M 1/7253 | 345/156 |

* cited by examiner

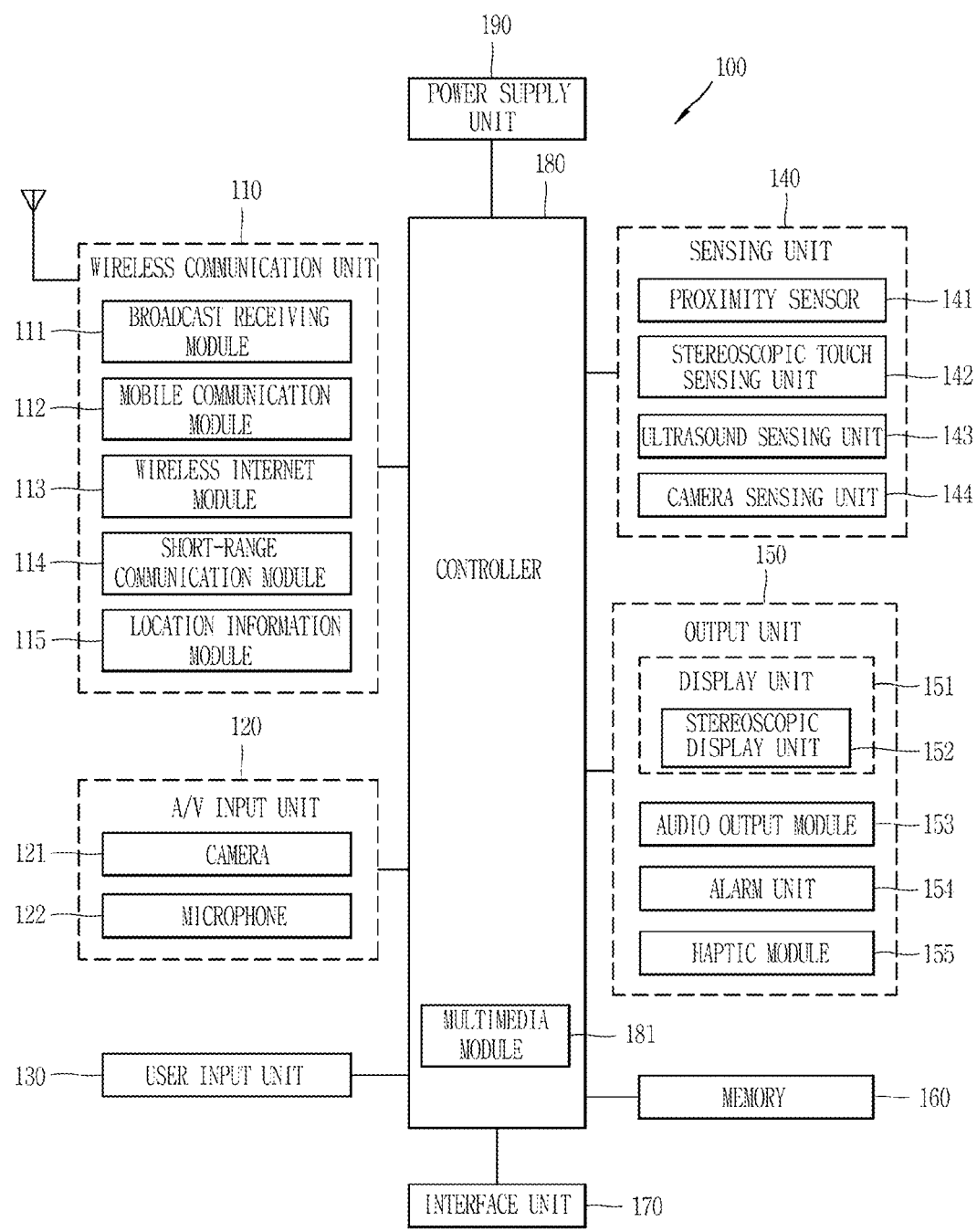

FIG. 5C
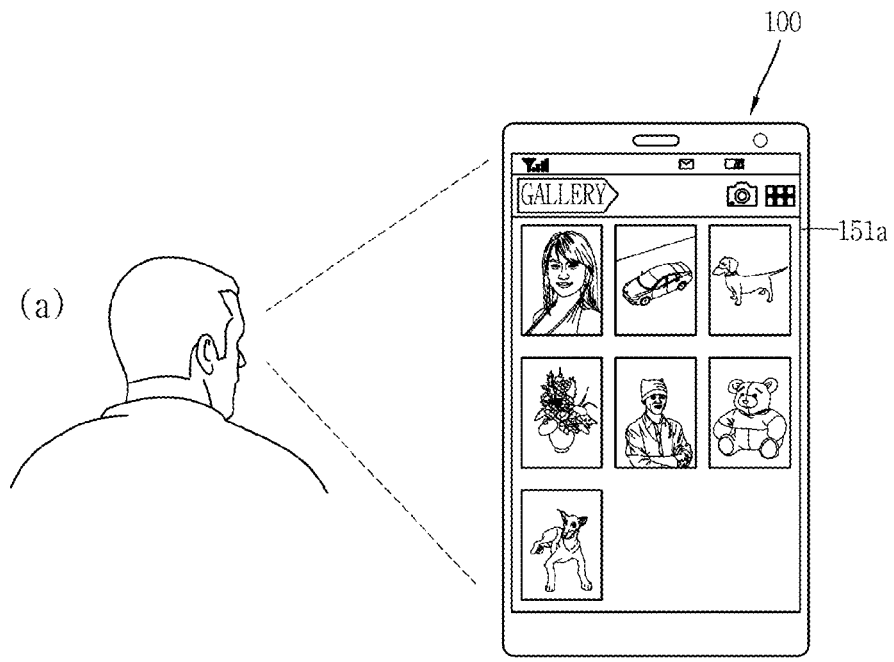
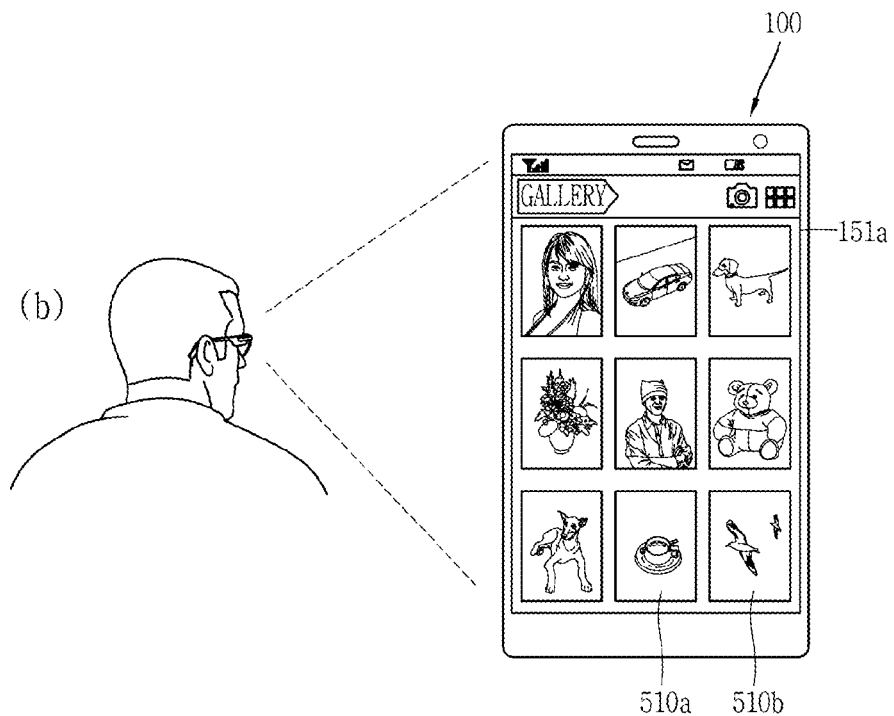

FIG. 7C
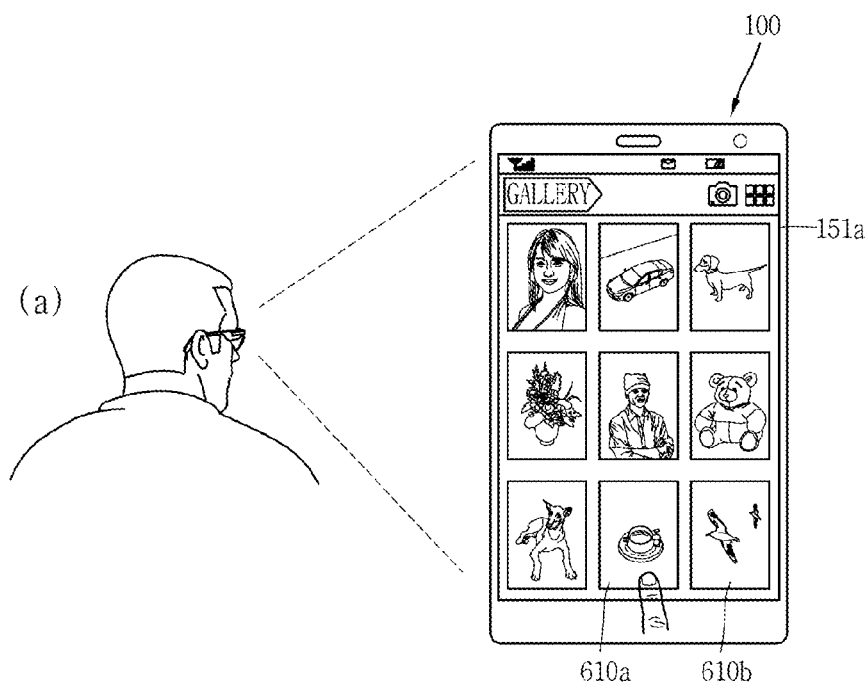
(a)
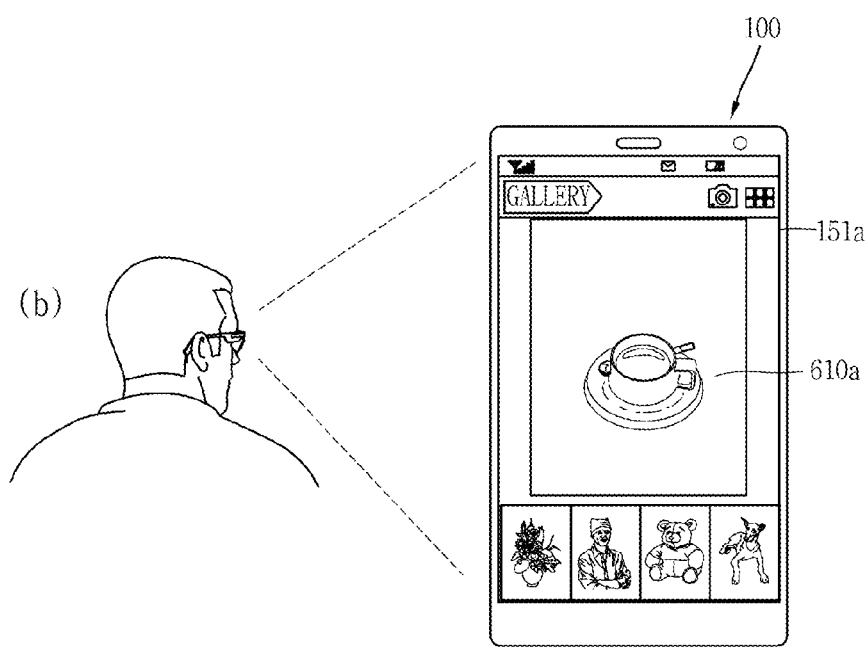
(b)

FIG. 8A
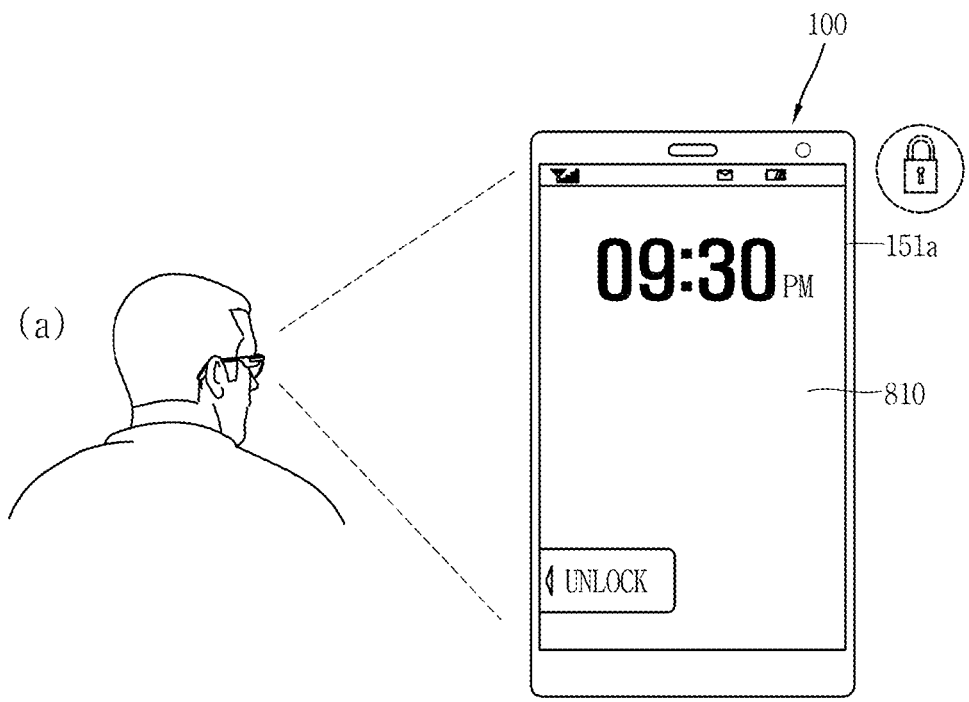
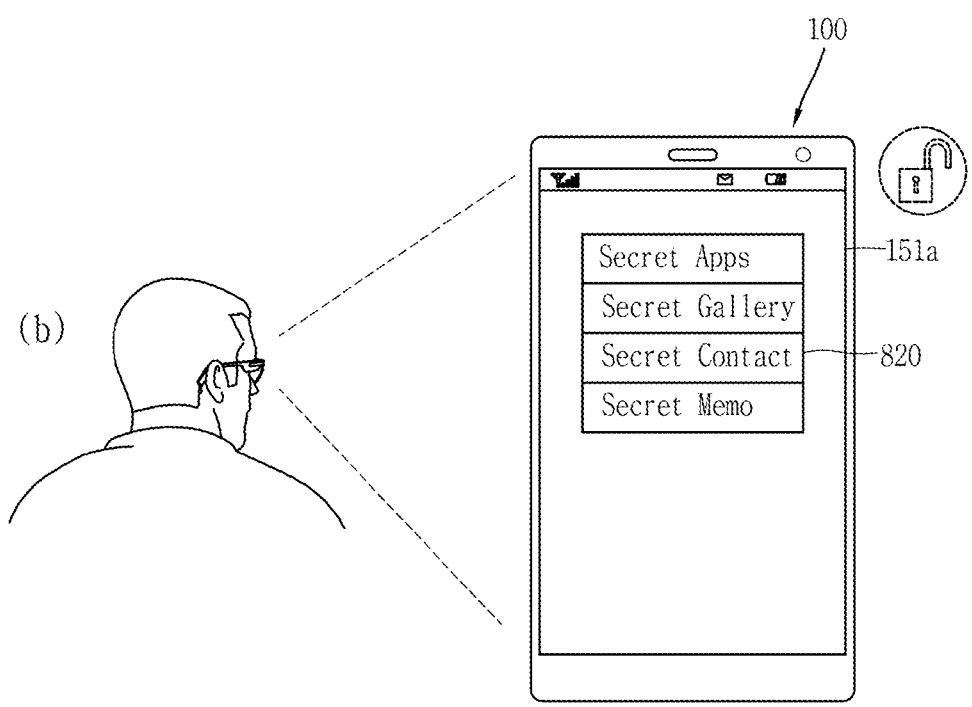

FIG. 8B
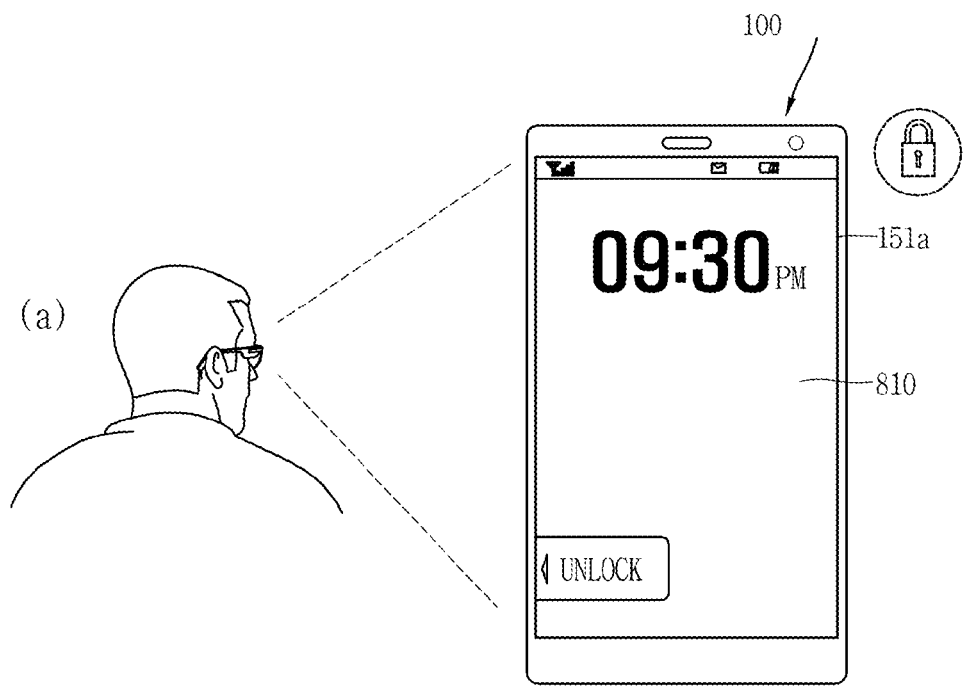
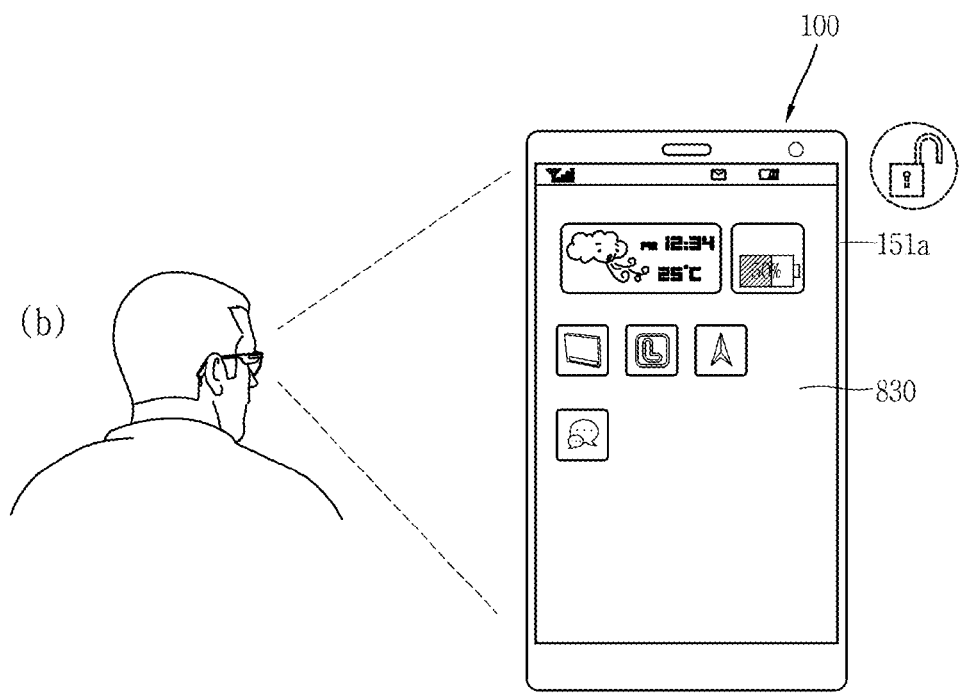

FIG. 8C
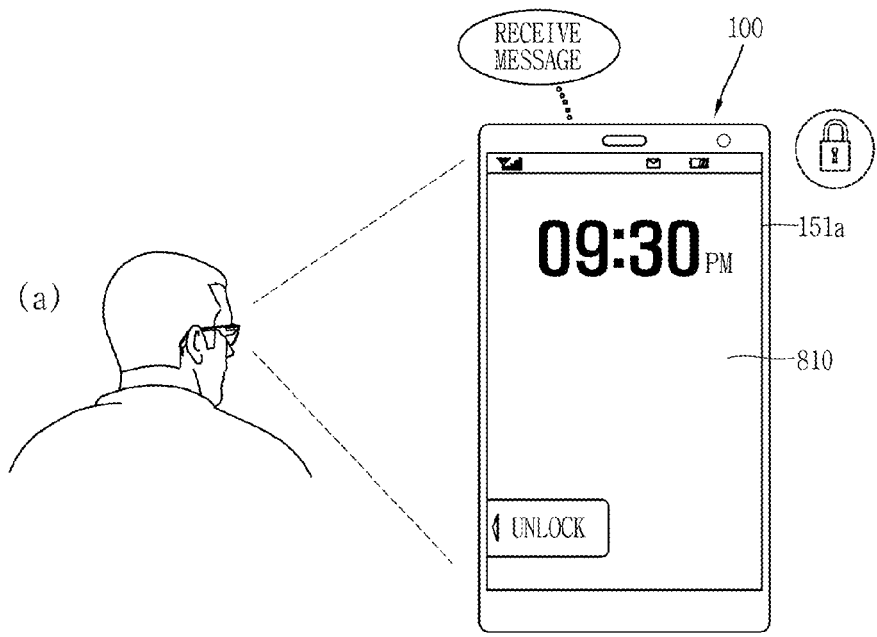
(a)
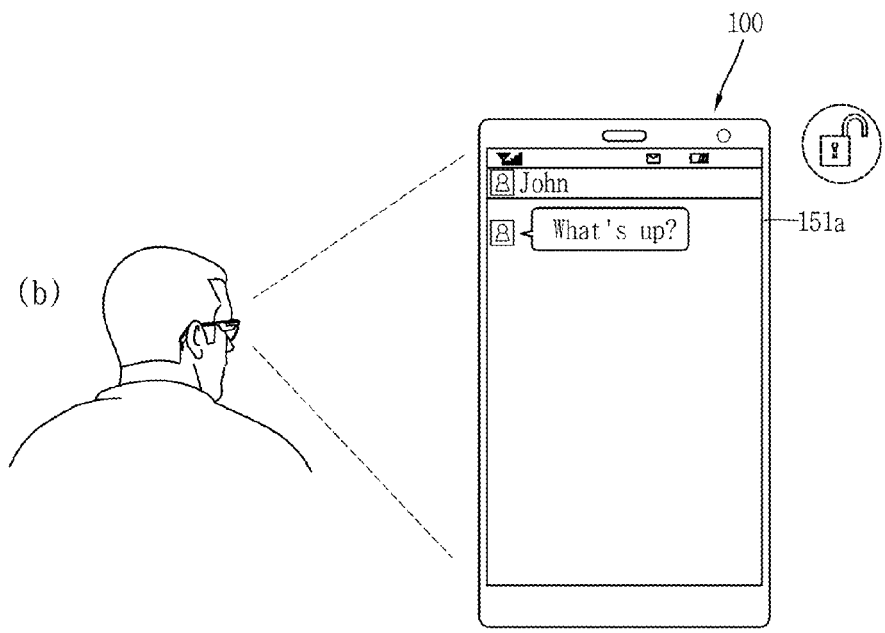
(b)

FIG. 9
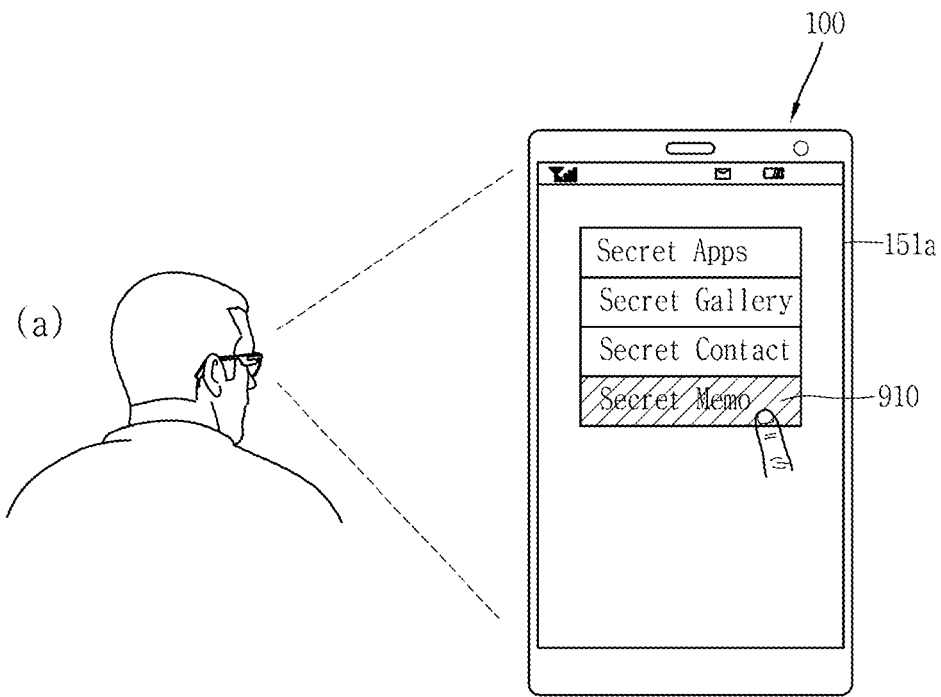
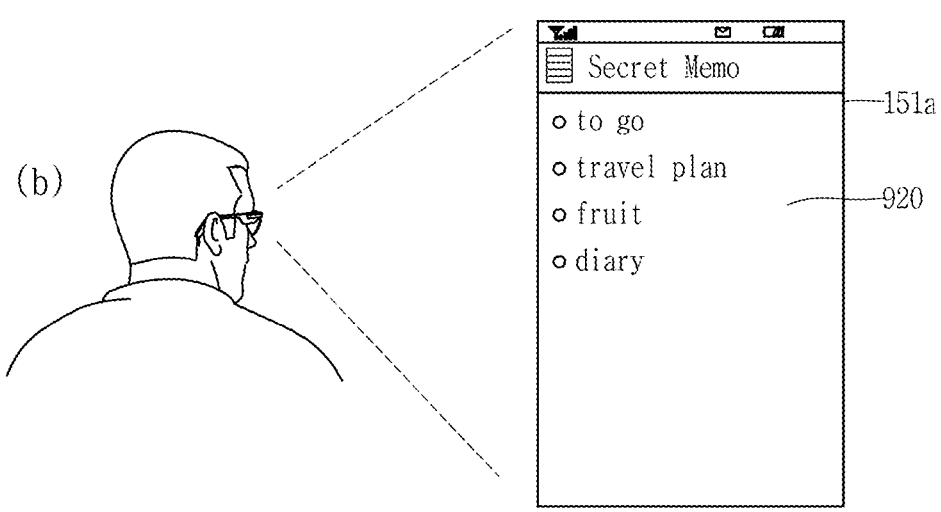

FIG. 10
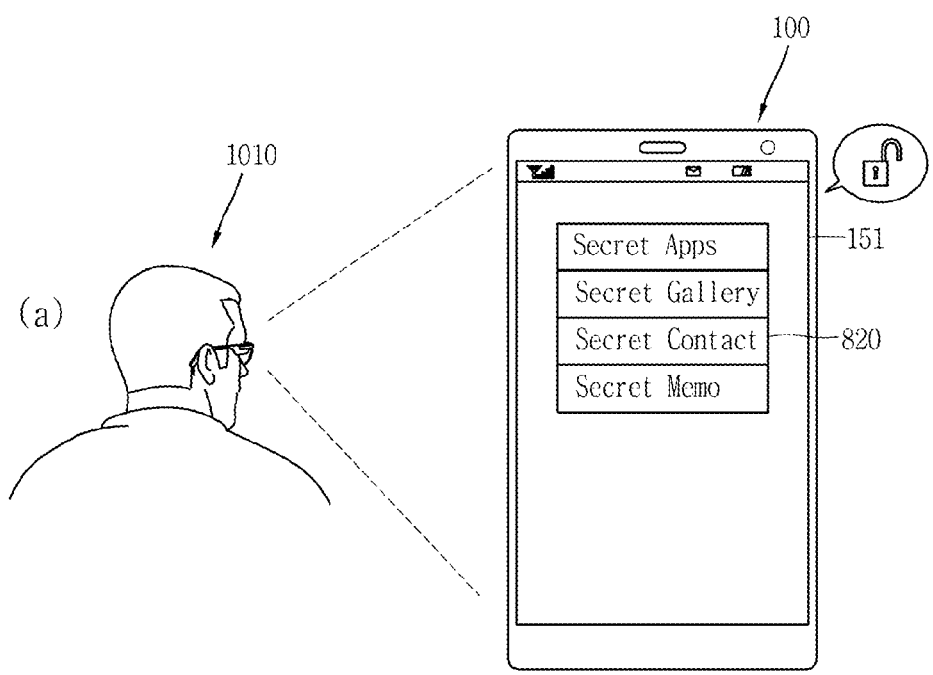
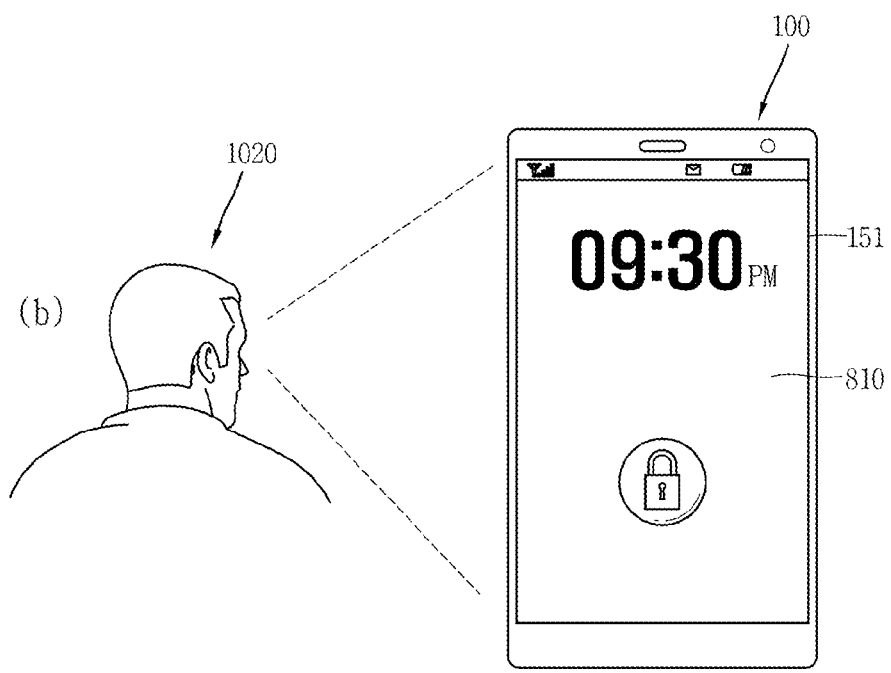

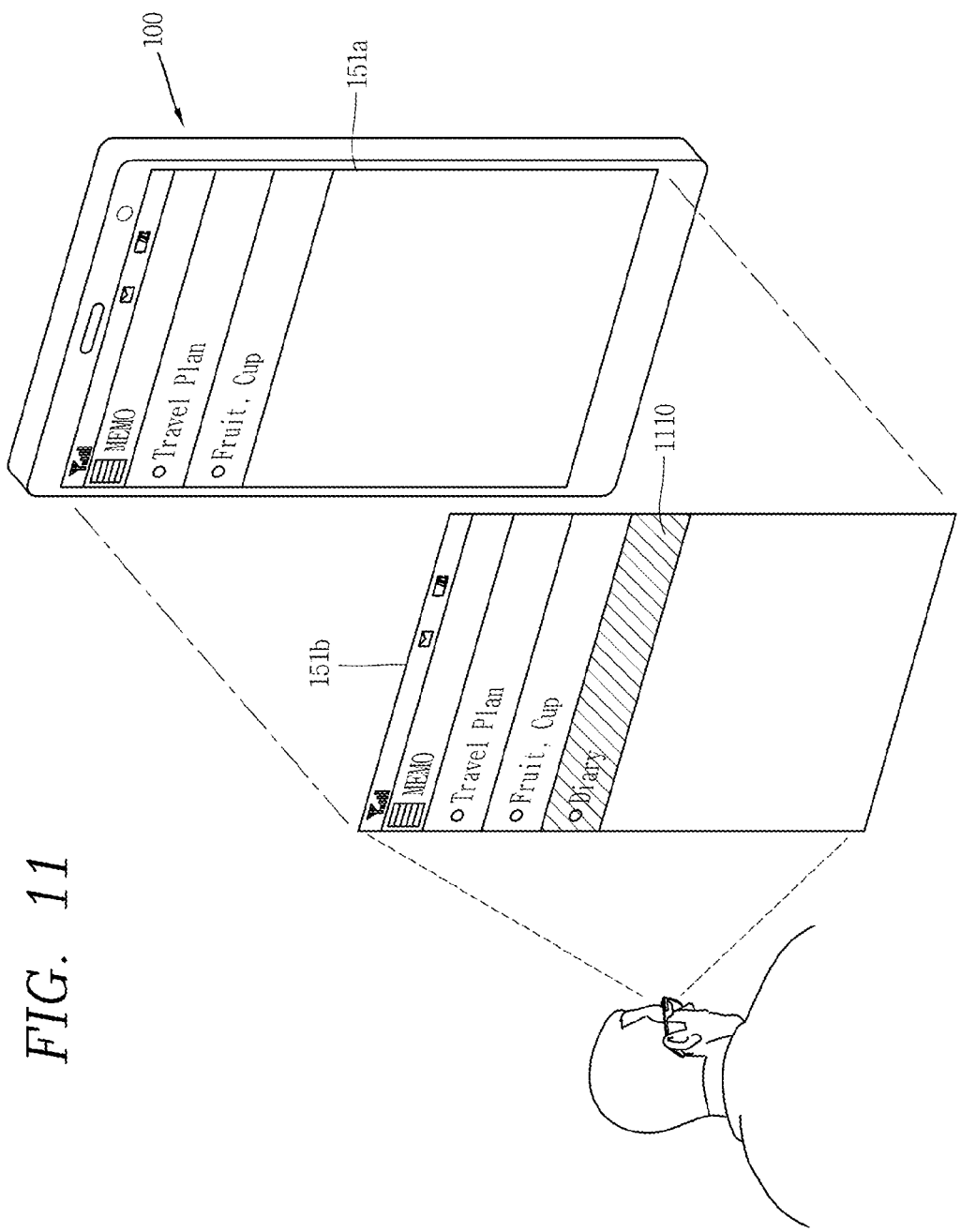

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2013-0133748, filed on Nov. 5, 2013, the contents of which is incorporated by reference herein in its entirety.

BACKGROUND OF THE DISCLOSURE

1. Field of the Disclosure

This specification relates to a mobile terminal that may communicate with a glass-type terminal and a method for controlling the same.

2. Background of the Disclosure

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device. Further, such mobile terminal may communicate with at least one other mobile terminal using near-field wireless communication.

A growth in the structure and software of mobile terminals led to the increasing risk of data spillage. To address such issue, a need for various security functions exists.

SUMMARY OF THE DISCLOSURE

There, an aspect of the detailed description is to provide a method of using a glass-type terminal to reinforce security for personal information.

To achieve these and other advantages and in accordance with the purpose of this specification, as embodied and broadly described herein, there is provided a mobile terminal comprising a wireless communication unit configured to communicate with a glass-type terminal, a display unit configured to display visual information, and a controller configured to transmit output-limited information having a limitation in output on the display unit to the glass-type terminal so that the output-limited information may be output on the glass-type terminal when the mobile terminal is in communication with the glass-type terminal.

In an embodiment, the output-limited information is information relating to visual information output on the display unit.

In an embodiment, the controller is configured to output a graphic object indicating that there is the output-limited information on the display unit.

In an embodiment, when a function associated with the output-limited information is executed based on a user's touch input on the graphic object, the controller is configured to transmit screen information on the function to the glass-type terminal so that the screen information on the function may be output on the glass-type terminal.

In an embodiment, when a function associated with the graphic object is executed, the controller is configured to limit the output of screen information corresponding to execution of the function on the display unit.

In an embodiment, the graphic object is output in a region corresponding to a position where the output-limited information is predicted to be output on regions of the display unit.

In an embodiment, when the mobile terminal is in a locked state where a user's reception of a control command is limited, the controller is configured to release the locked state based on an unlocking signal received from the glass-type terminal.

In an embodiment, when the locked state is released based on the unlocking signal received from the glass-type terminal, the controller is configured to output a list corresponding to at least one function performed in interoperation with the glass-type terminal.

In an embodiment, when any one item is selected from the list, the controller is configured to transmit information relating to the selected item to the glass-type terminal so that a function relating to the selected item is executed.

In an embodiment, the unlocking signal is generated based on the mobile terminal accessing the glass-type terminal to be able to perform data communication.

In an embodiment, when the communication with the glass-type terminal is in pause, the controller is configured to switch back to the locked state.

In an embodiment, when information displayed on the display unit is varied and the output-limited information is included in the varied information, the controller is configured to control the wireless communication unit so that the output-limited information corresponding to the varied information is transmitted to the glass-type terminal.

In an embodiment, the controller is configured to limit the output of at least part of information that may be output on the display unit by a user's selection.

In an embodiment, a glass-type terminal communicable with a mobile terminal comprises a wireless communication unit configured to communicate with the mobile terminal, a display unit disposed at a position corresponding to a user's eyes and configured to output visual information, the display unit having light transparency, and a controller configured to output output-limited information limited in output on a display unit of the mobile terminal on the display unit when receiving the output-limited information from the mobile terminal while the glass-type terminal is linked with the mobile terminal so that data communication between the glass-type terminal and the mobile terminal is possible.

In an embodiment, the display unit is configured to transmit information output on the display unit of the mobile terminal so that the information output on the display unit of the mobile terminal is noticeable to the user, and the controller is configured to determine a position where the output-limited information is to be output considering a region where the information output on the display unit of the mobile terminal is transmitted.

In an embodiment, the controller is configured to process the output-limited information to be output in a highlighted fashion so that the output-limited information is noticeable to the user.

In an embodiment, when receiving the user's request for executing a function associated with the output-limited information, the controller is configured to transmit a control command for executing the function corresponding to the user's request to the mobile terminal so that the function corresponding to the user's request may be executed on the mobile terminal.

In an embodiment, when the function is executed on the mobile terminal in response to the control command, and there is the output-limited information corresponding to the execution of the function in the information output on the display unit of the mobile terminal, the controller is configured to control the wireless communication unit to receive the output-limited information corresponding to the execution of the function from the mobile terminal so that the output-limited information corresponding to the execution of the function may be output on the display unit from the mobile terminal.

In an embodiment, when the function associated with the output-limited information is a messaging function, the output-limited information corresponds to a message transmitted or received through the messaging function, and when receiving the user's request relating to a response to the message, the controller is configured to transmit a control command to execute a message responding function to the mobile terminal so that the message responding function may be executed on the mobile terminal in response to the user's request.

In an embodiment, a mobile terminal that may enter a locked state to limit a user's reception of a control command comprises a display unit, a wireless communication unit configured to communicate with a glass-type terminal, and a controller configured to switch the locked state to an unlocked state and output screen information on the display unit in response to communicating with the glass-type terminal through the wireless communication unit in the locked state.

In an embodiment, when the locked state switches to the unlocked state based on communication with the glass-type terminal, the controller is configured to output a list corresponding to at least one function performed in interoperation with the glass-type terminal.

In an embodiment, when the locked state switches to the unlocked state, any one of a plurality of home screen pages included in the mobile terminal is output on the display unit.

In an embodiment, when the communication with the glass-type terminal is in pause in the unlocked state, the mobile terminal is configured to switch back to the unlocked state.

In an embodiment, when continuing to perform communication with the glass-type terminal in the unlocked state, the controller is configured to immediately output security information requiring user authentication without a user authentication process on the security information.

In an embodiment, when the communication with the glass-type terminal is in pause while the security information is output on the display unit, the security information stops being output on the display unit.

In an embodiment, when the locked state switches to the unlocked state while an event occurs on the mobile terminal, screen information relating to the event is output on the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to an embodiment of the disclosure;

FIGS. 5A, 5B, and 5C are flowcharts each illustrating a control method as shown in FIG. 4;

FIGS. 7A, 7B, and 7C are concept views illustrating a control method when output-limited information is executed;

FIGS. 8A, 8B, and 8C are concept views illustrating an example in which a locked state is released in case a mobile terminal and a glass-type terminal interoperate with each other;

FIG. 9 is a concept view illustrating an example in which in case a mobile terminal and a glass-type terminal interoperate with each other, a function associated with the interoperation is executed;

FIG. 10 is a concept view illustrating an example in which in case a glass-type terminal does not interoperate with a mobile terminal, the mobile terminal switches back to the locked state; and FIG. 11 is a concept view illustrating an example in which output-limited information is output distinct from other visual information on a glass-type terminal.

DETAILED DESCRIPTION OF THE DISCLOSURE

Figure 2A:
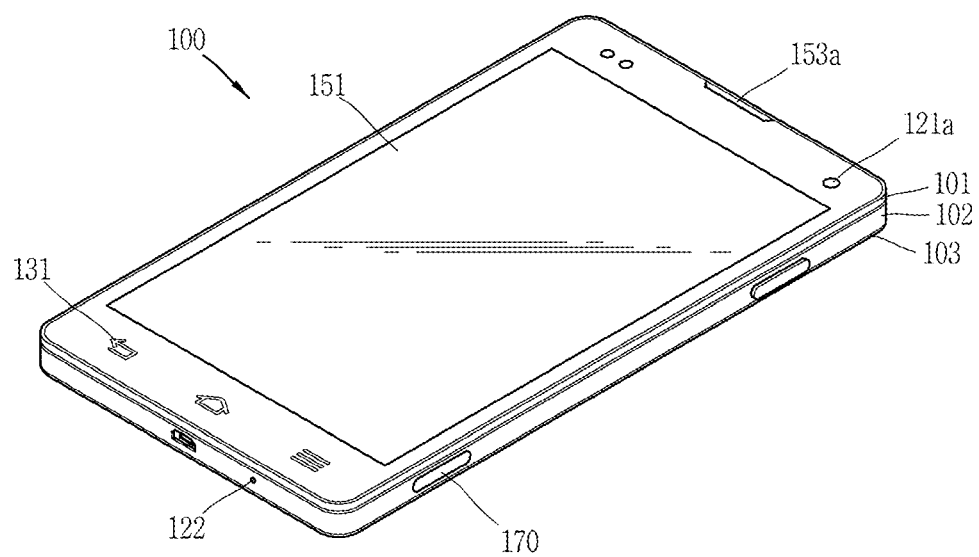
FIGS. 2a and 2b are perspective views illustrating the outer appearance of mobile terminals 100 according to embodiments of the disclosure.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, etc.

However, it will be obvious to those skilled in the art that the present invention may be also applicable to a fixed terminal such as a digital TV, a desktop computer and a digital signage, except for specific configurations for mobility.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views counterpart, whereas the voice call mode indicates a call performed while a user does not view counterpart. For implementation of the video call mode and the voice call mode, the mobile communication module 112 is configured to transmit and receive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short range communication module 114 is a module for supporting short range communications. Some examples of short range communication technology include Bluetooth™, Radio Frequency IDentification (RFID), Infrared Data Association (IrDA), Ultra-WideBand (UWB), ZigBee™, Near Field Communication (NFC) and the like.

The location information module 115 is a module for acquiring a location (or position) of the mobile communication terminal. For example, the location information module 115 may include a GPS (Global Positioning System) module.

Referring to FIG. 1, the A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the radio communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration motion and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more displays 151. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area of a touch object, but also a touch pressure.

Here, the touch object is an object to apply touch to the touch sensor, which may be a finger, a touch pen, a stylus pen, a pointer, etc.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch motion state, or the like), and information corresponding to the sensed proximity touch operation and the proximity touch pattern can be output to the touch screen.

The audio output module 152 may output audio data received from the radio communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. The video signal or audio signal may be output through the display unit 151 or the audio output module 152. Therefore, the display unit 151 and the audio output module 152 may be categorized as part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are input or output. The memory 160 may store data relating to various patterns of vibrations and sounds output when touch input to the touch screen is sensed.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit 151 in the locked state.

The power supply unit 190 receives external power or internal power and supplies appropriate power required for operating respective elements and components under control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2B:
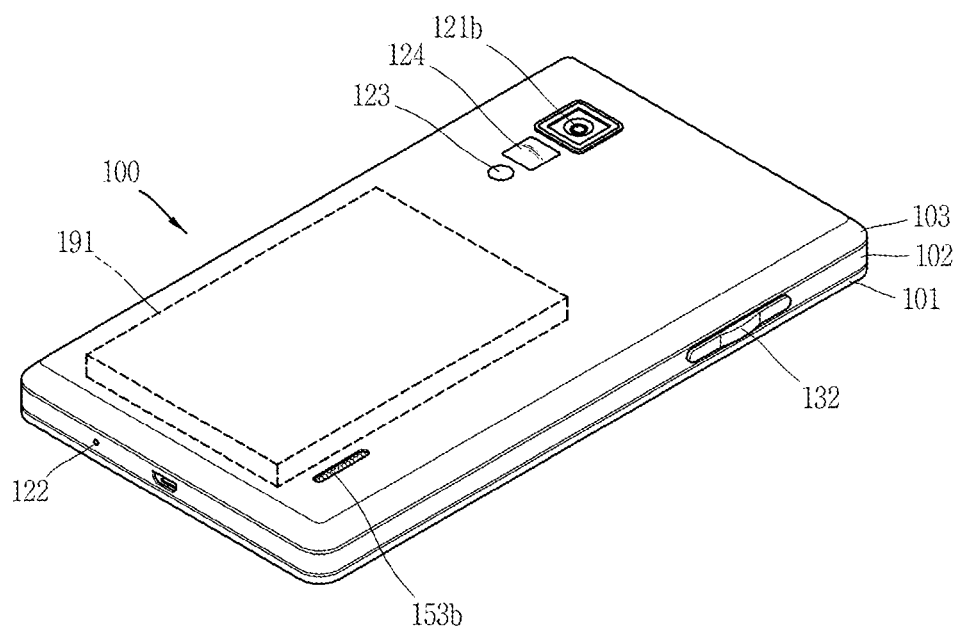

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

According to an embodiment of the disclosure, the mobile terminal that may include the above-described components may communicate with an external device using the wireless communication unit 110. The external device may be any electronic device that has the wireless communication unit 110. In an embodiment, the external device may be a head mounted display (HMD) device that has the wireless communication unit 110 and that may be mounted on the user's head. Hereinafter, the HMD device may be used interchangeably with the glass-type terminal.

Figure 3:
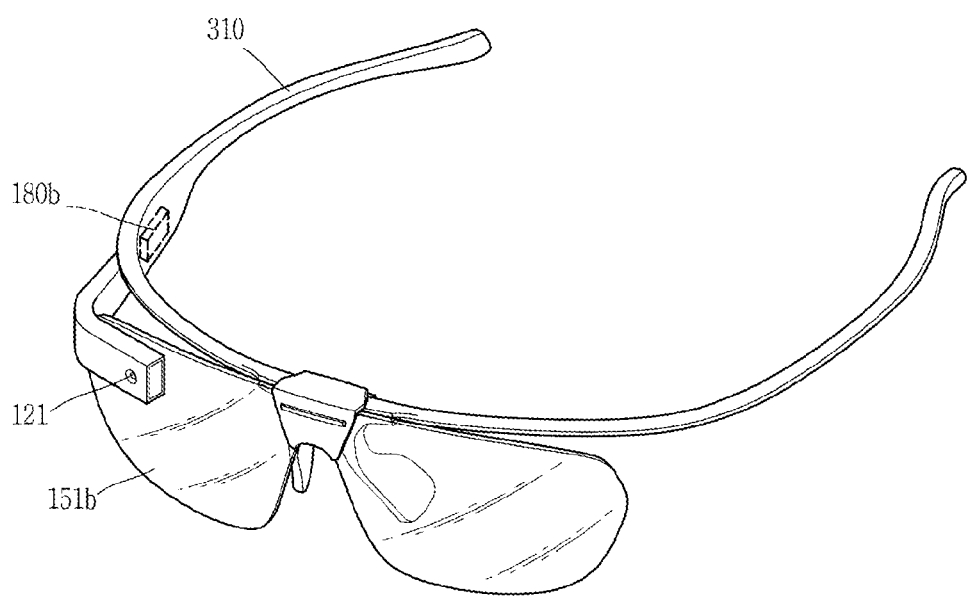
FIG. 3 is a perspective view illustrating a glass-type terminal according to an embodiment of the disclosure.

The glass-type terminal is now described in greater detail. Referring to FIG. 3, the glass-type terminal according to the disclosure includes a main body 310, a display unit 151b, and a controller 180b.

According to the disclosure, the glass-type terminal may further include a user input unit, a voice recognition unit, and an operation sensing unit.

According to the disclosure, the glass-type terminal may be implemented as a HMD. In a particular embodiment, the glass-type terminal may be implemented as smart glasses.

The main body 310 is formed to be mountable on the user's head. For example, the main body 310 may include the frame and legs of smart glasses.

The display unit 151b may be coupled with the main body 310 and may be disposed at positions corresponding to the user's eyes. The display unit 151b may have transparency and output visual information.

The visual information means a virtual object that is generated from the glass-type terminal or received from the external device. For example, the virtual object may mean an application or a user interface (UI) corresponding to the application, such as icons, content, or communication mode. The virtual object may be generated by the controller 180b or may be received from a mobile terminal such as a smartphone.

Since the display unit 151b has transparency, the user may view the external environment through the display unit 151b.

Further, in another embodiment, the display unit 151b may output information on any external object in the external environment while showing the external environment. For example, the external object may be an external device that may communicate with the glass-type terminal.

As described above, the controller 180b may control the glass-type terminal. Further, the controller 180b may be mounted in the main body 310 of the glass-type terminal or may be integrally formed with the main body 310. In another embodiment, the controller 180b may be positioned away from the main body 310.

The first portion 121 may be positioned at a front side of at least one of the left-eye and right-eye display units 151b. Or, the camera 121 may be positioned on a side of the main body 310 or each of two sides of the main body 310 to image-capture a space departing from the wearer's view.

The audio output unit 130 may be implemented as a separate touch panel on a side or each of two sides of the main body 310. Or, the user input unit 130 may be implemented as a physical key. For example, a power-on/off switch may be provided on a side of the main body 310.

In another embodiment, the user input unit 130 may be implemented as a separate external device that is connected with the main body 310. Accordingly, the user may input a particular command to the separate external device. Or, the display unit 151b may be implemented as a touch screen that allows a control command to be received directly from the user.

In another embodiment, the user input unit 130 may be implemented as a module that recognizes the user's voice commands. Accordingly, the user may input a particular command to the main body 310 through his voice.

Meanwhile, as an embodiment of the wearable glass-type terminal, smart glasses are commercially available. The smart glasses implemented as a wearable device may simply run the functions that are executed by the existing mobile terminals.

The display unit 151b of the smart glasses may display visual information as well as the external environment shown through the display unit 151b in an augmented reality manner. Accordingly, the user may easily grasp the information in any objects constituting the external environment.

Further, the smart glasses may wirelessly communicate with other smart glasses or an external device that may communicate with smart glasses. In this case, information relating to the external device may be output to the display unit.

According to the disclosure, the mobile terminal and the glass-type terminal may interwork with each other by way of communication therebetween. Hereinafter, this is described in greater detail.

The display unit and the controller of the mobile terminal are referred to by reference denotations 151a and 180a, respectively. The display unit and the controller of the glass-type terminal are referred to by reference denotations 151b and 180b, respectively.

Figure 4:
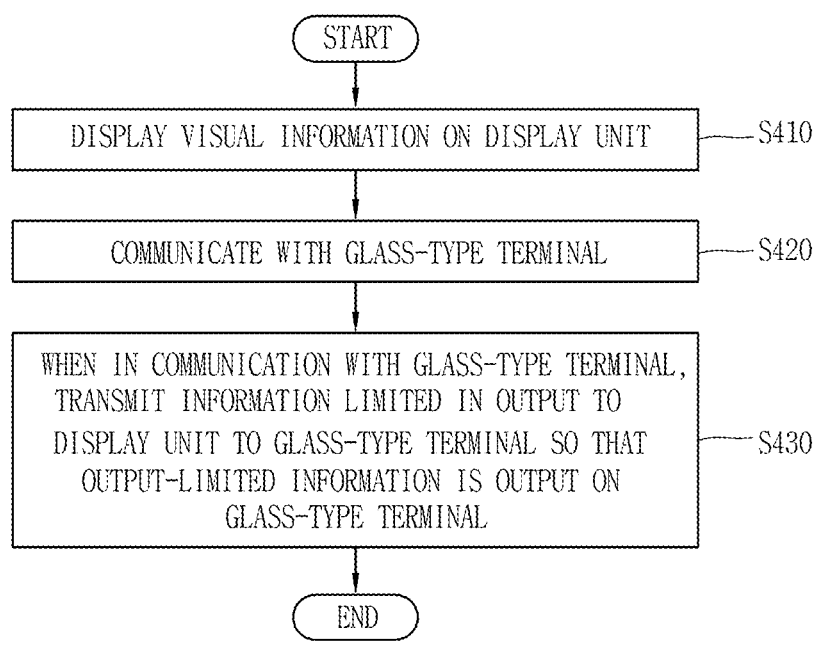
FIG. 4 is a flowchart illustrating a method for controlling a mobile terminal according to an embodiment of the disclosure.
Figure 5A:
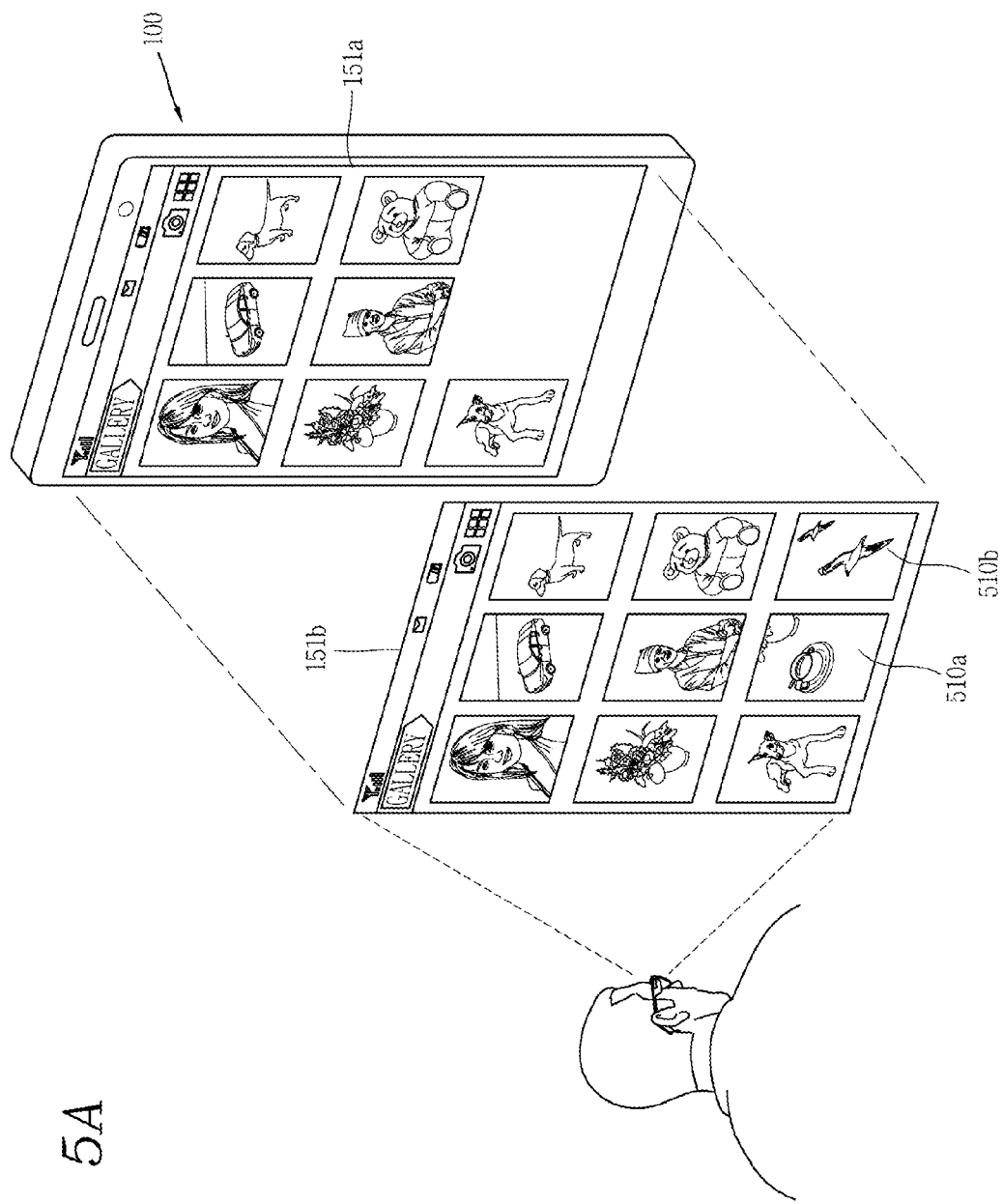
Figure 5B:
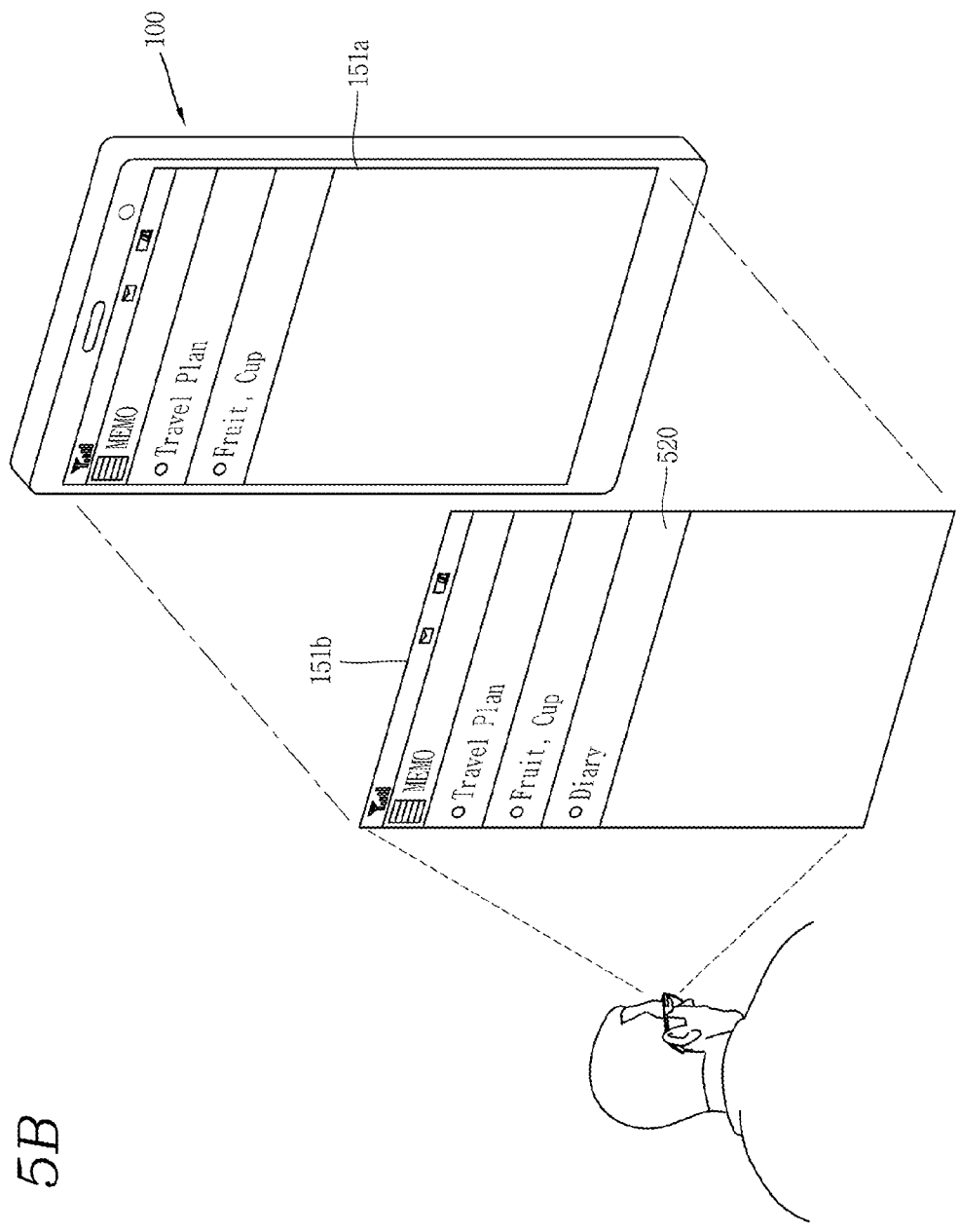

FIG. 4 is a flowchart illustrating a method for transmitting information whose output to the display unit 151a is limited (for example, security information) to the glass-type terminal when the mobile terminal communicates with glass-type terminal according to an embodiment of the disclosure. FIGS. 5a and 5b are concept views illustrating a control method as shown in FIG. 4.

According to an embodiment of the disclosure, the mobile terminal may perform the step of displaying visual information on the display unit 151a (S410).

The display unit 151a may output visual information regarding various operations that may be executed in the mobile terminal. In this case, the visual information may be output in various ways according to the operations that are performed in the mobile terminal.

For example, in case an image application is executed on the mobile terminal, the visual information may include a plurality of images. Further, the visual information may include memos relating to electronic note functions, received or sent messages, home screen page, and lock screen representing the locked state in which the user's reception of control commands is limited.

Thereafter, according to an embodiment of the disclosure, the mobile terminal may perform the step of communicating with glass-type terminal (S420).

According to the disclosure, the mobile terminal may communicate with the glass-type terminal by way of a network. The network may be wirelessly connected with the mobile terminal.

For example, the wireless network may be at least one of a wireless personal area network, a wireless local area network, a wireless mesh network, a wireless metropolitan area network, a wireless wide area network, and a cellular network. However, the type of the wireless network is not limited to the above-listed ones.

Further, the mobile terminal and the glass-type terminal may communicate with each other through a 3G or 4G network. For example, the mobile terminal may transmit information to the glass-type terminal via the 3G or 4G network. However, the disclosure is not limited thereto, and the mobile terminal and the glass-type terminal may communicate with each other by a 2G or a next-generation communication scheme.

Further, the mobile terminal and the glass-type terminal may communicate with each other via a personal area network (PAN). Meanwhile, a wireless personal area network (WPAN) may function as a PAN through a wireless network technique such as wireless personal area network, wireless local area network, a wireless mesh network, a wireless metropolitan area network, a wireless wide area network, and a cellular network. Further, the PAN may be implemented through a wired computer bus such as USB or FireWire. Further, an NFC (Near Field Communication) scheme may be also used as a type of the PAN.

In addition to the above-described ones, the mobile terminal and the glass-type terminal may be linked to each other via at least one communication scheme of Wi-Fi (Wireless-Fidelity), Wi-Fi Direct (Wireless-Fidelity Direct), and DLNA (Digital Living Network Alliance). The external device may be one of various external devices equipped with a wireless communication unit, such as a smart TV, a smart watch, and a computer.

The controller 180a may determine whether the glass-type terminal and the mobile terminal are currently communicating with each other. For example, the controller 180a, in case the mobile terminal may communicate valid data with the glass-type terminal, may determine that the mobile terminal and the glass-type terminal are presently in communication with each other. As another example, the controller 180a, in case the mobile terminal is receiving a communication signal from the glass-type terminal, may determine that the mobile terminal and the glass-type terminal are presently in communication with each other. As still another example, in case the controller 180 determines through the visual information obtained through the camera 121 that the user is now wearing the glass-type terminal, the controller 180 may determine that the mobile terminal and the glass-type terminal are under the state where the mobile terminal and the glass-type terminal may communicate with each other.

Meanwhile, the controller 180 may determine whether the glass-type terminal and the mobile terminal stopped their mutual communication. For example, in case the mobile terminal is not under the circumstance where the mobile terminal cannot communicate valid data with the glass-type terminal, the controller 180a may determine that the communication between the mobile terminal and the glass-type terminal has stopped. As another example, when the mobile terminal fails to receive a communication signal from the glass-type terminal for a predetermined time or longer, the controller 180a may determine that the communication between the mobile terminal and the glass-type terminal has stopped. As still another example, when determining that the user's not now putting on the glass-type terminal, the controller 180a may determine that the communication between the mobile terminal and the glass-type terminal has stopped.

When presently in communication with the glass-type terminal, the mobile terminal according to an embodiment of the disclosure may perform the step of transmitting information whose output to the display unit is limited (for example, security information requiring user authentication) to the glass-type terminal so that the output-limited information may be output on the glass-type terminal (S430).

Various pieces of visual information may be output to the display unit 151a. In this case, among the output visual information, at least predetermined pieces of visual information or at least some pieces of visual information selected by the user may be limited in output. The predetermined output-limited information may be retained in the memory unit 160. For example, the predetermined information may be security information requiring user authentication (e.g., accredited certificate information). Further, the information limited in output by the user's selection may be information associated with personal information. For example, the information on a password may be limited in output by the user's selection.

Further, the output-limited information may be determined based on the user's selection. For example, the user may set at least some of the information stored in the memory unit 160 as information that is to be limited in output. Here, the information to be limited in output or the information that has been already limited in output may mean the information that may be output on the display unit 151a only when going through a separate authentication process (for example, entry of predetermined authentication information or entry of a predetermined password).

Accordingly, upon reception of a user's request for outputting the output-limited information, the controller 180a may send a request for entry of authentication information using at least one of aural, visual, or tactile methods to the user.

Meanwhile, a graphic object may be output on the display unit 151a to inform that there is output-limited information, and such graphic object may be represented as a particular image. Here, the particular image may have a lock shape. For example, in case there is an output-limited image file, the controller 180a may output a lock-shaped graphic object instead of a thumbnail image (or preview image or representative image) of the image file.

The controller 180a may transmit the output-limited information to the glass-type terminal so that the output-limited information may be output on the glass-type terminal.

The glass-type terminal, when receiving the output-limited information, may output the output-limited information on the display unit 151b.

The display unit 151b of the glass-type terminal may display the information limited in output to the display unit 151a, as well as the information being currently output on the display unit 151a of the mobile terminal.

In this case, as at least one method for outputting the information to the display unit 151b of the glass-type terminal, the external information may be transmitted (or shown) through the display unit 151b of the glass-type terminal, or the glass-type terminal may receive the information from the mobile terminal and output the information on the display unit 151b based on the received information.

For example, the information output to the display unit 151a of the mobile terminal may be shown to the user through the display unit 151b of the glass-type terminal. In other words, the information output to the display unit 151a of the mobile terminal may be shown (or transmitted) to the display unit 151b of the glass-type terminal.

Further, the glass-type terminal may receive the information output to the display unit 151a of the mobile terminal from the mobile terminal. In such case, the glass-type terminal may output the received information that has bene output to the display unit 151a of the mobile terminal on the display unit 151b of the glass-type terminal.

Meanwhile, the information limited in output to the display unit 151a of the mobile terminal may also be output on the display unit 151b of the glass-type terminal. To that end, the glass-type terminal may receive the output-limited information from the mobile terminal.

When receiving the output-limited information, the glass-type terminal may output the output-limited information on the display unit 151b.

The output-limited information on the display unit 151b of the glass-type terminal may be determined considering the position where the information output to the display unit 151a of then mobile terminal is transmitted (or output) to the display unit 151b of the glass-type terminal. For example, the output-limited information may be output at the position of the display unit 151b of the glass-type terminal, corresponding to a position at which to be predicted to be output (hereinafter, "output-predicted position") on the display unit 151a of the mobile terminal.

The output-predicted position may mean the position where information would have been output unless the output to the display unit 151a were limited. For example, in case there is a output-limited file among a plurality of image files contained in a gallery, the output-predicted position may mean the position where the output-limited file would be output unless the output of the output-limited file were limited.

Meanwhile, the mobile terminal according to an embodiment of the disclosure may output the output-limited information to the display unit 151a as well as the glass-type terminal, based on being in communication with the glass-type terminal. In other words, the glass-type terminal may function as an authentication means that allows the output-limited information to be output to the mobile terminal. For example, the controller 180a may output the output-limited information to the display unit 151a only when the mobile terminal is in communication with the glass-type terminal. In this case, the user may view the output-limited information only through the glass-type terminal.

The controller 180a may enable the output-limited information output on the display unit 151a to disappear from the display unit 151a if the communication between the mobile terminal and the glass-type terminal is in pause. In such case, the user might not view the output-limited information even through the glass-type terminal.

A method for controlling information output to the display unit 151b of the glass-type terminal and the display unit 151a of the mobile terminal based on the mobile terminal being in communication with the glass-type terminal is now described in greater detail.

At least part of the visual information output on the display unit 151a may remain limited in output. In such case, the controller 180a may output the output-limited information on the display unit 151a using the glass-type terminal.

In this case, the output-limited information may be output on either or both of the display unit 151a of the mobile terminal and the display unit 151b of the glass-type terminal.

For example, referring to FIG. 5A, the user may view the display unit 151a of the mobile terminal through the glass-type terminal. In this case, the plurality of image files contained in a gallery may be output on the display unit 151a of the mobile terminal.

The user may view the display unit 151a of the mobile terminal through the glass-type terminal. In this case, output-limited image files 510a and 510b may be included in the display unit 151a.

The controller 180a may transmit information on the output-limited image files 510a and 510b to the glass-type terminal so that the output-limited image files 510a and 510b may be output on the display unit 151b of the glass-type terminal. In this case, the controller 180a may transmit the output-limited image information when the glass-type terminal and the mobile terminal are in the state where the glass-type terminal and the mobile terminal may communicate with each other.

The user may view the information 510a and 510b limited in output to the display unit 151a of the mobile terminal through the display unit 151b of the glass-type terminal. For example, the display unit 151b of the glass-type terminal may output the image files 510a and 510b that are not output on the display unit 151a of the mobile terminal. In this case, the output-limited image files 510a and 510b may be output at the position where they would be output unless there were no limitation in the output of the image files 510a and 510b.

Meanwhile, although the output-limited information is output on the display unit 151b of the glass-type terminal, the output-limited information might not be output on the display unit 151a.

As another example, memo-related information may be output on the display unit 151a of the mobile terminal. In this case, part of the memo-related information may be limited in output. For example, the output-limited information may be the user's personal information (for example, password, authentication number, etc.).

The controller 180 may transmit the output-limited information to the glass-type terminal to output the output-limited information on the glass-type terminal.

When the glass-type terminal receives the output-limited information, the user may view the information limited in output to the display unit 151a of the mobile terminal, as well as the content output to the display unit 151a of then mobile terminal.

For example, as shown in FIG. 5B, the display unit 151a of the mobile terminal may output information relating to an electronic note function. In such case, the user may view the display unit 151a of the mobile terminal through the glass-type terminal presently in communication with the mobile terminal.

In such case, the display unit 151b of the glass-type terminal may output the output-limited information 520 as well as the information output on the display unit 151a of the mobile terminal. The user may view the output-limited information as well as the information output on the display unit 151a of the mobile terminal.

In this case, the position where the information that was not output is output on the display unit 151b of the glass-type terminal may be determined considering the position where the information output on the mobile terminal is transmitted through the display unit 151b of the glass-type terminal. For example, the positon where the output-limited information is output may be the position on the display unit 151b of the glass-type terminal, corresponding to the position where the output-limited information would be output on the mobile terminal unless the output-limited information were limited in output.

For example, as shown in FIG. 5B, the information limited in output to the mobile terminal may be information 520 relating to a diary. In this case, the diary-related information 520 may be output on the display unit 151b of the glass-type terminal. The diary-related information 520 may be output immediately under the information relating to the diary-related information 520 among the information output on the mobile terminal.

Meanwhile, according to the disclosure, the output-limited information may be output on the display unit 151a of the mobile terminal, and the output-limited information may be output on the display unit 151a of the mobile terminal based on a signal received from the glass-type terminal. FIG. 5C is a concept view illustrating an example in which screen information output on a mobile terminal varies depending on whether the user wears a glass-type terminal.

The controller 180a, in case the mobile terminal is in communication with the glass-type terminal through a wireless communication unit, may determine whether to output visual information on the display unit 151a based on whether the mobile terminal is in communication with the glass-type terminal. For example, the controller 180a, when sensing that the mobile terminal is not in communication with the glass-type terminal, may limit the output of at least part of the visual information output on the display unit 151a of the mobile terminal. Further, the controller 180a, when sensing that the mobile terminal is in communication with the glass-type terminal, may output the output-limited visual information on the display unit 151a.

For example, as shown in FIG. 5C(a), in case the mobile terminal is not in communication with the glass-type terminal, there may be information limited in output to the display unit 151a. In contrast, as shown in FIG. 5C(b), when sensing that the mobile terminal is in communication with the glass-type terminal, the images 510a and 510b that were not output in FIG. 5C(a) may be output.

In this case, although not shown, even when the output-limited information is being output on the display unit 151a, the controller 180a, in case the mobile terminal stops communication with the glass-type terminal, may prevent the output-limited information from being re-output.

A method for outputting information limited in output to the display unit 151a has been described above. Accordingly, the user may control the output of visual information on the display unit using the glass-type terminal.

Figure 6:
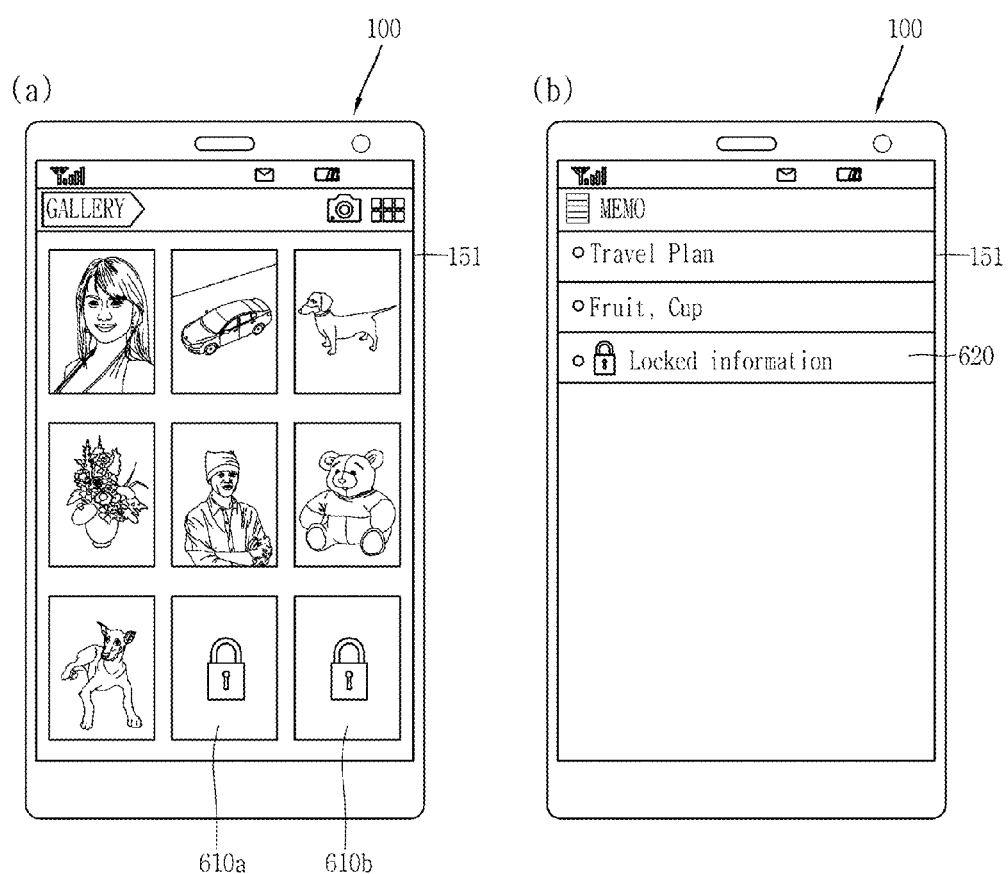
FIG. 6 is a concept view illustrating a method for outputting a graphic object indicating output-limited information.

Hereinafter, a method for outputting a graphic object indicating that there is information limited in output to the display unit 151a of the mobile terminal is described in greater detail. FIG. 6 illustrates various methods for outputting a graphic object indicating that there is output-limited information.

The controller 180a may limit the output of at least part of visual information output on the mobile terminal. In this case, the controller 180a may output a graphic object indicating that there is output-limited information on the display unit 151a. The graphic object may be output in various manners. For example, as shown in FIG. 6(a), the graphic object may have a lock shape 610a or 610b. Further, as shown in FIG. 6(b), the graphic object may be a phrase 620 indicating that there is output-limited information.

Further, the graphic object may be output on a predetermined area of the display unit 151a. For example, the graphic object may be output at an output-predicted position of the output-limited information. The output-predicted position may mean the position where the output-limited information would be output unless there were no limit in output of the output-limited information.

Separately from the graphic object, notice information informing that the output-limited information may be output through communication with the glass-type terminal may be output. For example, the notice information indicating that the information may be output when putting on the glass-type terminal may be output at the output-predicted position of the output-limited information.

Various methods for outputting a graphic object indicating that there is output-limited information have been described above. The user may recognize the presence of information limited in output to the display unit 151*a* of the mobile terminal through the graphic object. Further, the user may appreciate the method for outputting the output-limited information.

Figure 7A:
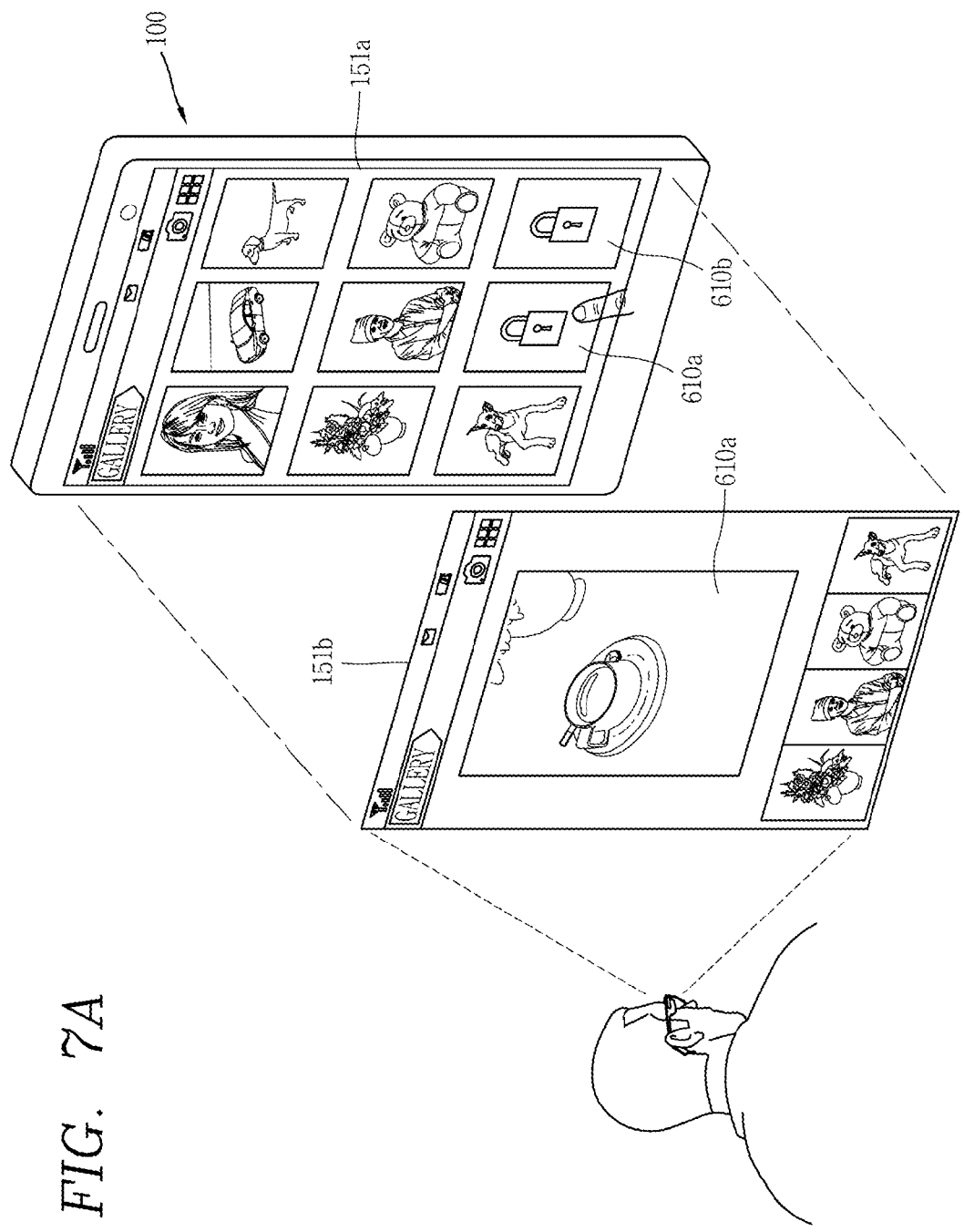
Figure 7B:
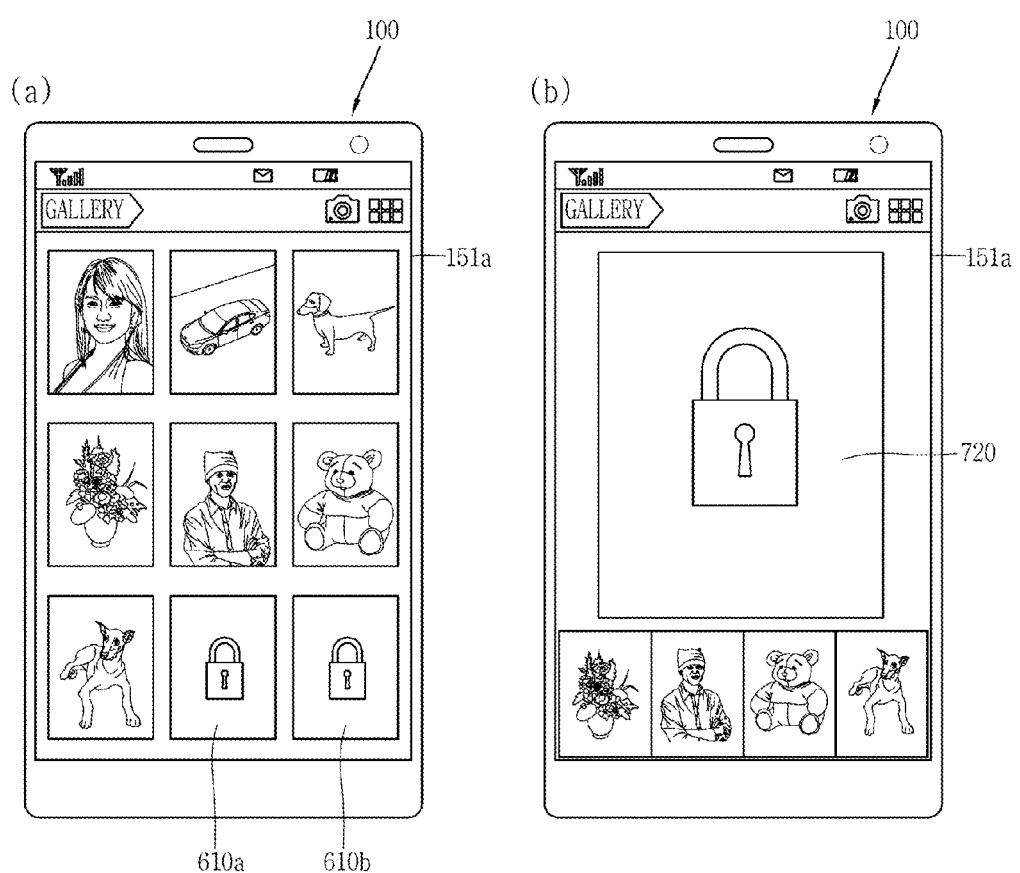

Hereinafter, a control method when output-limited information is selected is described in greater detail. FIGS. 7*a*, 7*b*, and 7*c* are concept views illustrating a method for controlling a mobile terminal and a glass-type terminal when information limited in output to the mobile terminal is selected.

The controller 180*a* may control both the output of the display unit 151*b* of the glass-type terminal and the output of the display unit 151*a* of the mobile terminal based on a control command applied to the display unit 151*a*. For example, when any function is executed based on a touch input on the display unit 151*a*, the user may output screen information corresponding to the function to the display unit 151*b* of the glass-type terminal.

For example, the display unit 151*a* of the mobile terminal may output graphic objects 610*a* and 610*b* indicating that there is output-limited information. In this case, the user may select the graphic objects 610*a* and 610*b*. In this case, the controller 180*a* may execute functions associated with the graphic objects 610*a* and 610*b* based on the user's touch input on the graphic objects 610*a* and 610*b*.

In case the function associated with the output-limited information is executed, the controller 180*a* may transmit the screen information on the function associated with the output-limited information to the glass-type terminal so that the screen information on the function associated with the output-limited information may be output on the glass-type terminal.

When receiving the screen information on the function associated with the output-limited information, the glass-type terminal may execute the function associated with the output-limited information. For example, the user may select the graphic objects 610*a* and 610*b* output on the display unit 151*a* of the mobile terminal by a touch input. In this case, the screen information 610*a* corresponding to the execution of the graphic object-related function may be output on the display unit 151*b* of the glass-type terminal.

Referring to FIG. 7A, a plurality of image files included in a gallery may be output on the display unit 151*a* of the mobile terminal. In this case, at least one image file 610*a* and 610*b* of the plurality of image files may be limited in output. To indicate the limited image files 610*a* and 610*b*, the display unit 151*a* of the mobile terminal may output the graphic objects 610*a* and 610*b* indicating that the output of the image files is limited.

In this case, as shown in FIG. 7A, in case the user selects the graphic objects 610*a* and 610*b* by a touch input, the display unit 151*b* of the glass-type terminal may execute the function associated with the graphic object 610*a*. In this case, the display unit 151*b* of the glass-type terminal may output the screen information 610*a* corresponding to the execution of the function. For example, the display unit 151*b* of the glass-type terminal may output the output-limited image 610*a* relating to the graphic object.

Meanwhile, referring to FIG. 7B(b), the output of screen information corresponding to the execution of the function associated with the graphic object on the display unit 151*a* of the mobile terminal where the output-limited information is executed may be limited. In this case, the display unit 151*a* may output a graphic object indicating that the screen information is not varied regardless of the execution of the output-limited information or that the screen of execution of the output-limited information is also limited in output.

For example, as shown in FIG. 7B, in case any one 610*a* of the output-limited images is selected, the display unit 151*a* of the mobile terminal may output a screen image 720 indicating that the output of the image file is limited, instead of outputting the image file associated with the graphic object. For example, the display unit 151*a* of the mobile terminal may output a lock-shaped image 720 indicating that there is information limited in output to the display unit 151*a* of the mobile terminal.

Meanwhile, although outputting the output-limited information on the display unit 151*b* of the glass-type terminal has been described above in connection with FIGS. 7*a* and 7*b*, the disclosure is not limited thereto. In the mobile terminal according to an embodiment of the disclosure, the output-limited information may be output on the display unit 151*a* using the glass-type terminal.

The controller 180*a*, when sensing that the mobile terminal is in communication with the glass-type terminal, may output the output-limited information on the display unit 151*a*. For example, as shown in FIG. 7C(a), the display unit 151*a* may output at least one image 610*a* and 610*b* that had a limitation in output before communication with the glass-type terminal.

In this case, the user may select any one of at least one image that was limited in output. For example, as shown in FIG. 7C(a), the controller 180*a* may select any one 610*a* among the at least one image based on the user's touch input.

In this case, when the mobile terminal is in communication with the glass-type terminal, the controller 180*a* may run the function associated with the output-limited information. For example, in case any one image is selected, the controller 180*a* may output the image on the display unit 151*a*.

Although not shown, the output-limited information output on the display unit 151*a* while the mobile terminal is in communication with the glass-type terminal, in case the communication with the glass-type terminal is in pause, may not output the output-limited information on the display unit 151*a* any longer. In this case, when the communication is in pause, the controller 180*a* may output a graphic object indicating that there is the output-limited information.

A method for controlling the mobile terminal and the glass-type terminal in case a function associated with the information limited in output to the display unit 151*a* of the mobile terminal is executed has been described above. Accordingly, the user may reinforce the security of the output-limited information. Further, the user may control the information output on the display unit 151*b* of the glass-type terminal only by controlling the mobile terminal. Further, the user may control both the glass-type terminal and the mobile terminal only by entry of a control command to the mobile terminal even without direct control of the glass-type terminal.

A method for unlocking a mobile terminal using a glass-type terminal is not described. FIGS. 8a, 8b, and 8c are concept views illustrating a method for controlling visual information output on the display units of the glass-type terminal and the mobile terminal based on an unlocking signal of the glass-type terminal when the mobile terminal is in a locked state.

According to an embodiment of the disclosure, the mobile terminal may be in a locked state 810 where the user's reception of a control command is limited. Under the locked state 810, running a function by the user's control command may be restricted.

In this case, the user may release the locked state 810 using the glass-type terminal that may communicate with the mobile terminal.

In an embodiment, the controller 180a may switch the locked state 810 to an unlocked state in response to access to the glass-type terminal. In other words, the controller 180a, in case the mobile terminal gains access to the glass-type terminal, may shift the locked state to the unlocked state. Here, the term "access" may mean a state in which the mobile terminal may communicate valid data with the glass-type terminal or a state in which data communication is performed in such an extent that it may be recognized to be able to communicate with the glass-type terminal.

As such, even when not receiving a separate unlocking signal from the glass-type terminal, the controller 180a, as long as the mobile terminal may communicate with the glass-type terminal, may switch the locked state 810 to the unlocked state. In such case, the glass-type terminal may play a role as a medium to allow the mobile terminal to switch from the locked state to the unlocked state.

Meanwhile, whether to release the locked state of the mobile terminal using the glass-type terminal may be determined by the user's selection. For example, configuring the mobile terminal to use the glass-type terminal to release the locked state of the mobile terminal or setting the mobile terminal to release the locked state of the mobile terminal regardless of the communication with the glass-type terminal may rely on the user's selection.

As another example, the controller 180a may switch the locked state to the unlocked state based on an unlocking signal received from the glass-type terminal. Such unlocking signal may be transmitted to the mobile terminal based on the selection of the user who wears the glass-type terminal. Meanwhile, the unlocking signal may be automatically generated from the glass-type terminal and may be transmitted from the glass-type terminal to the mobile terminal when the mobile terminal gains access to the glass-type terminal even when there is no user's selection.

Meanwhile, in case the locked state switches to the unlocked state, the display unit 151a of the mobile terminal may output various pieces of screen information. For example, in case the locked state is released based on a signal received from the glass-type terminal, the controller 180a may output screen information relating to the glass-type terminal. Or, although the locked state is released based on a signal received from the glass-type terminal, the controller 180a may output the same screen information as the screen information output when the locked state is released through the user's manipulation of the mobile terminal.

Hereinafter, the screen information output on the display unit when the switch from the locked state to the unlocked state occurs through the communication with the glass-type terminal is described in more detail.

In an embodiment, in case the locked state is released by way of communication with the glass-type terminal, the controller 180b may output screen information that allows the user to more easily reach the function that may be executed in interoperation with the glass-type terminal.

The screen information being output may be represented as "glass-type terminal mode." In such case, it may be appreciated that the glass-type terminal mode has been executed.

In the glass-type terminal mode, the information may be output simultaneously so that the user may more easily access the functions executable in interoperation with the glass-type terminal. For example, as shown in FIG. 8A(b), in the glass-type terminal mode, there may be at least one of an application executable only on the glass-type terminal, an application relating to an image viewable only on the glass-type terminal, contact information viewable only on the glass-type terminal, and memo information viewable only on the glass-type terminal.

Further, in case the glass-type terminal mode is in execution, the display unit 151a of the mobile terminal may output a list 820 corresponding to at least one function that may be performed in interoperation with the glass-type terminal. The list 820 may be a list of the functions executable only on the glass-type terminal as described above.

As another example, in case the locked state is released using the glass-type terminal, the display unit 151a of the mobile terminal may output the same screen information as the screen information output when the locked state is released through the user's manipulation of the mobile terminal. For example, the screen information may be any one of a plurality of home screen pages.

In case the mobile terminal is not in communication with the glass-type terminal any longer after the locked state is released, the mobile terminal may switch back to the locked state. In this case, the mobile terminal being not in communication with the glass-type terminal any longer may mean the state in which the mobile terminal may not communication valid data with the glass-type terminal. Further, the mobile terminal being not in communication with the glass-type terminal may mean the state in which the mobile terminal communicates valid data with the glass-type terminal but does not receive communication signals in a predetermined time.

As shown in FIG. 8B(b), the controller 180a, when the locked state of the mobile terminal is released, may output any one 830 of a plurality of home screen pages on the display unit 151a.

Although not shown, the controller 180a may switch the mobile terminal back to the locked state if the communication with the glass-type terminal is in pause while the page 830 is displayed.

Meanwhile, an event may occur on the mobile terminal while the mobile terminal is in the locked state. The event may mean all types of events that may occur on the mobile terminal, such as a message receiving event, a call event, an email receiving event, a notice information output event, etc.

If the locked state is released using the glass-type terminal after the event has occurred in the locked state, the controller 180a may output screen information relating to the event on the display unit 151a.

For example, as shown in FIG. 8C(b), the controller 180a, in case the message receiving event occurs, may immediately output the screen information relating to the message receiving event on the display unit 151a.

Additionally, in case the display unit 151b of the glass-type terminal outputs visual information relating to the event on the display unit 151b, the user may execute the function associated with the event based on a control command using the glass-type terminal. The control command using the glass-type terminal may include pressurizing a manipulation unit of the glass-type terminal, a voice command, a gesture command, etc. For example, the user may execute the functions of checking, deleting, and replying the message received from the mobile terminal by manipulating the manipulation unit of the glass-type terminal.

Meanwhile, the event-related screen information might not be output on the display unit 151a any longer in case the communication with the glass-type terminal. In this case, the controller 180a may switch the mobile terminal back to the locked state.

The operation of the mobile terminal when receiving an unlocking signal from the glass-type terminal has been described. Accordingly, the user wearing the glass-type terminal may more easily control the mobile terminal in interoperation with the glass-type terminal. Further, according to the disclosure, the security of the mobile terminal may be reinforced by configuring the function executed only when in interoperation with the glass-type terminal.

Further, the user may release the locked state using only the glass-type terminal or check and control the event that occurs on the mobile terminal while maintaining the locked state of the mobile terminal.

Hereinafter, executing a function included in the glass-type terminal mode based on a control command applied to the mobile terminal in the glass-type terminal mode is described. FIG. 9 is a concept view illustrating an example in which a function included in a glass-type terminal mode is executed based on a control command applied to the mobile terminal in the glass-type terminal mode.

In case the mobile terminal gains access to the glass-type terminal to be able to perform data communication, the mobile terminal may run the glass-type terminal mode. In the glass-type terminal mode, an input using the mobile terminal and an input using the glass-type terminal may be both received.

For example, the user may control the glass-type terminal mode through a control command applied to the mobile terminal while the glass-type terminal mode is in execution. As shown in FIG. 9(a), in the glass-type terminal mode, the display unit 151a of the mobile terminal may output a list 820 corresponding to at least one executed in interoperation with the glass-type terminal.

In this case, the user may select any one item 910 in the list. The controller 180a of the mobile terminal may transmit the item-related information to the glass-type terminal so that the function associated with the item 910 selected by the user is executed.

When receiving the information relating to the item, the glass-type terminal may execute the function corresponding to the information relating to the item. Further, the display unit 151b of the glass-type terminal may output the screen image 920 of execution of the function corresponding to the information relating to the item.

For example, referring to FIG. 9(b), the controller 180a of the mobile terminal, in case the user selects a memo-related function in the list, may execute the function associated with the memo. In this case, the controller 180a of the mobile terminal may transmit the memo-related information to the glass-type terminal. When receiving the memo-related information, the glass-type terminal may output the screen image 920 corresponding to the function associated with the memo on the display unit 151b.

Although a method for executing a function through the user's entry to the mobile terminal has been described, the disclosure is not limited thereto. The disclosure may be applicable through the manipulation unit of the glass-type terminal.

Meanwhile, the mobile terminal in execution of the glass-type terminal mode, when stopping communication with the glass-type terminal, may switch back to the locked state. FIG. 10 is a concept view illustrating an example in which the mobile terminal switches back to the locked state in case the data communication between the mobile terminal and the glass-type terminal is in pause.

In case the glass-type terminal remains linked to the mobile terminal in such a state that the glass-type terminal and the mobile terminal may perform data communication (1010), the mobile terminal may execute the glass-type terminal mode. However, in case the data communication between the mobile terminal and the glass-type terminal is in pause (1020), the mobile terminal might not execute the glass-type terminal mode any longer.

In this case, when the data communication is in pause may include when the glass-type terminal does not communicate with the mobile terminal any longer or when the glass-type terminal may not communicate with the mobile terminal. When the glass-type terminal may not communicate with the mobile terminal may include when communication of valid data is impossible, such as, e.g., when the user does not wear the glass-type terminal or when the wireless communication unit of the glass-type terminal terminates its operation.

In case the data communication is in pause, the mobile terminal may switch back to the locked state without running the glass-type terminal mode any longer. For example, in case the glass-type terminal is linked (1010) to the mobile terminal as shown in FIG. 10(a), the mobile terminal may stay in execution with the glass-type terminal mode. In this case, when the user does not wear the glass-type terminal (1020) as shown in FIG. 10(b), the mobile terminal may switch back to the locked state.

Executing the glass-type terminal mode including a function that may be executed in interoperation with the glass-type terminal when the mobile terminal is linked with the glass-type terminal has been described above. The user may more conveniently run the function in which the glass-type terminal and the mobile terminal are in interoperation with each other by executing the glass-type terminal-dedicated mode using the glass-type terminal.

Further, in case the communication between the glass-type terminal and the mobile terminal is in pause, the mobile terminal, rather than keep running the glass-type terminal mode, may switch back to the locked state. By doing so, the user may run the glass-type terminal mode only when the glass-type terminal is put in use.

A method for displaying output-limited information visually distinctively from non-output-limited information on the mobile terminal is now described. FIG. 11 is a concept view illustrating a method for displaying output-limited information distinctively from non-output-limited information on the mobile terminal.

There may be information to be output on the display unit 151a and information limited in output to the display unit 151a. In this case, the controller 180a may transmit the output-limited information to the glass-type terminal in order to output the output-limited information on the glass-type terminal.

When receiving the output-limited information, the glass-type terminal may output the output-limited information on the display unit 151b of the glass-type terminal. In this case, the display unit 151*b* of the glass-type terminal may output the output-limited information and non-output-limited information. Here, the non-output-limited information may be transmitted through the display unit 151*b* of the glass-type terminal or output on the display unit 151*b* of the glass-type terminal.

The display unit 151*b* of the glass-type terminal may output the output-limited information in a highlighted fashion so that the output-limited information may be noticeable to the user.

The highlighted fashion may include, but is not limited to, rendering the output-limited information to have a different contrast from that of the non-output-limited information, putting an animation effect (for example, blinking or moving effect), or outputting the information in bold type.

For example, as shown in FIG. 11, among the pieces of the screen information relating to an electronic note function in the mobile terminal, the diary information 1110 may be output-limited information. In this case, the display unit 151*b* of the glass-type terminal may output the diary information 1110 in a more shaded manner than the non-output-limited information.

Although a method for outputting the output-limited information on the display unit 151*b* of the glass-type terminal to be visually distinct from the non-output-limited information has been described above, the output-limited information may also be output on the display unit 151*a* of the mobile terminal. In this case, the output-limited information may be output on the display unit 151*a* of the mobile terminal, while distinct from the non-output-limited information. In other words, the embodiments may also be applicable to when the output-limited information is output on the display unit 151*a* of the mobile terminal.

According to the disclosure, the information limited in output to the mobile terminal may be output only on the glass-type terminal by way of communication between the mobile terminal and the glass-type terminal. By doing so, the user may view the output-limited information through the glass-type terminal.

Further, according to the disclosure, the output of, e.g., security-related information on the mobile terminal may be limited by the user's selection. Accordingly, the user may reinforce the security of personal information.

Various embodiments may be implemented using a machine-readable medium having instructions stored thereon for execution by a processor to perform various methods presented herein. Examples of possible machine-readable mediums include ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a wireless communication unit configured to communicate with a glass-type terminal;
   a display unit configured to display visual information; and a controller configured to:
   control the display unit to display a plurality of image files included in a gallery and at least one graphic object,
   wherein the at least one graphic object corresponds to at least one image file included in the gallery,
   wherein the at least one image file is a security information requiring user authentication and limited in output, and
   wherein the at least one graphic object is displayed for the at least one image file indicating that the output, of the at least one image file is limited while the user authentication is not processed in the mobile terminal;
   determine whether the glass-type terminal and the mobile terminal are communicating with each other; and
   control the display unit to display the at least one image on a region that the at least one graphic object is displayed based on the communication between the glass-type terminal and the mobile terminal,
   wherein the at least one graphic object displayed on the region is switched into the at least one image file based on the communication between the glass-type terminal and the mobile terminal, and
   wherein the at least one image file disappears from the region and the at least one graphic object appears on the region when the communication between the mobile terminal and the glass-type terminal is terminated,
   wherein when a function associated with security information corresponding to one of the at least one image file is executed based on a user's touch input on one of the at least one graphic object, the controller is configured to transmit screen information on the function to the glass-type terminal so that the screen information on the function may be output on the glass-type terminal.

2. The mobile terminal of claim 1, wherein when a function associated with one of the at least one graphic object is executed, the controller is configured to limit the output of screen information corresponding to execution of the function on the display unit.

3. The mobile terminal of claim 1, wherein the graphic object is output in the region corresponding to a position where the security information corresponding to the at least one image file is predicted to be output on regions of the display unit.

4. The mobile terminal of claim 1, wherein when the mobile terminal is in a locked state where a user's reception of a control command is limited, the controller is configured to release the locked state based on an unlocking signal received from the glass-type terminal.

5. The mobile terminal of claim 4, wherein when the locked state is released based on the unlocking signal received from the glass-type terminal, the controller is configured to output a list corresponding to at least one function performed in interoperation with the glass-type terminal.

6. The mobile terminal of claim 5, wherein when any one item is selected from the list, the controller is configured to transmit information relating to the selected item to the glass-type terminal so that a function relating to the selected item is executed.

7. The mobile terminal of claim 4, wherein the unlocking signal is generated based on the mobile terminal accessing the glass-type terminal to be able to perform data communication.

8. The mobile terminal of claim 7, wherein when the communication with the glass-type terminal is in pause, the controller is configured to switch back to the locked state.

9. The mobile terminal of claim 1, wherein when information displayed on the display unit is varied and the security information is included in the varied information, the controller is configured to control the wireless communication unit so that the security information corresponding to the varied information is transmitted to the glass-type terminal.

10. The mobile terminal of claim 1, wherein the controller is configured to limit the output of at least part of information that may be output on the display unit by a user's selection.

\* \* \* \* \*